(12) United States Patent
Murphy

(10) Patent No.: US 9,818,266 B2
(45) Date of Patent: Nov. 14, 2017

(54) REMOTE DISABLING OF TARGET POINT-OF-SALE ("POS") TERMINALS

(71) Applicant: Bank of America Corporation, Charlotte, NC (US)

(72) Inventor: Matthew D. Murphy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/357,698

(22) Filed: Nov. 21, 2016

(65) Prior Publication Data

US 2017/0169670 A1 Jun. 15, 2017

Related U.S. Application Data

(63) Continuation-in-part of application No. 14/476,958, filed on Sep. 4, 2014, which is a continuation of (Continued)

(51) Int. Cl.
*G06K 7/06* (2006.01)
*G07G 1/00* (2006.01)
(Continued)

(52) U.S. Cl.
CPC .......... *G07G 1/0009* (2013.01); *G06F 1/3228* (2013.01); *G06Q 20/341* (2013.01); (Continued)

(58) Field of Classification Search
CPC ... G07G 1/0009; G06F 1/3228; G06Q 20/341
See application file for complete search history.

(56) References Cited

U.S. PATENT DOCUMENTS 3,815,269 A  6/1974  Roselli
6,012,048 A  1/2000  Gustin et al.
(Continued)

OTHER PUBLICATIONS

"Credit Card Processing Calculator" (http://www.merchantcouncil.org/merchat-account/review-compare/credit-card-calculator.php), Merchantcouncil.org, Domains by Proxy, LLC (registrant), Scottsdale, Arizona, Aug. 1, 2012.
(Continued)

*Primary Examiner* — Christle I Marshall
*Assistant Examiner* — Asifa Habib
(74) *Attorney, Agent, or Firm* — Weiss & Arons LLP; Michael A. Springs, Esq.

(57) ABSTRACT

In response to detecting imposition of an erroneous surcharge, a point-of-sale ("POS") terminal used to impose that surcharge may be disabled. A remote server may be programmed to power down the POS terminal. For example, in response to detecting a surcharge violation, a remote server may transmit a disable signal to the POS terminal that triggered the surcharge violation. The disable signal may power down the POS terminal. The remote server may be programmed to power up a POS terminal or otherwise bring the POS terminal back online. A payment instrument that includes a chip may programmed such that when the chip is inserted into the POS terminal or an associated card reader, it triggers a disabling of the POS terminal. Servers that process transactions may be programmed to ignore or reject transactions received from a POS terminal that triggers a surcharge violation.

12 Claims, 20 Drawing Sheets

Related U.S. Application Data application No. 13/705,727, filed on Dec. 5, 2012, now Pat. No. 8,972,293.

(51) Int. Cl.
  *G06Q 20/34* (2012.01)
  *G06F 1/32* (2006.01)
  *G06Q 20/40* (2012.01)
  *G06Q 40/00* (2012.01)

(52) U.S. Cl.
  CPC ......... *G06Q 20/401* (2013.01); *G06Q 20/405* (2013.01); *G06Q 40/12* (2013.12)

(56) References Cited

U.S. PATENT DOCUMENTS

| | | | |
|---|---|---|---|
| 6,092,057 A * | 7/2000 | Zimmerman | G06Q 20/20 235/380 |
| 6,105,001 A | 8/2000 | Masi et al. | |
| 6,129,272 A | 10/2000 | Yoshida et al. | |
| 6,328,207 B1 | 12/2001 | Gregoire et al. | |
| 6,626,356 B2 | 9/2003 | Davenport et al. | |
| 6,999,943 B1 | 2/2006 | Johnson et al. | |
| 7,255,200 B1 | 8/2007 | Walter | |
| 7,308,356 B2 | 12/2007 | Melaku et al. | |
| 7,379,896 B1 * | 5/2008 | Meek | G06Q 20/1085 705/14.1 |
| 7,379,920 B2 | 5/2008 | Leung et al. | |
| 7,387,250 B2 | 6/2008 | Muni | |
| 7,447,657 B1 | 11/2008 | Krajewski et al. | |
| 7,668,780 B2 | 2/2010 | Battaglini et al. | |
| 7,731,084 B2 | 6/2010 | Redick et al. | |
| 7,882,026 B1 | 2/2011 | Zettner | |
| 7,949,555 B2 | 5/2011 | Young et al. | |
| 8,301,559 B2 | 10/2012 | McElroy et al. | |
| 8,320,962 B2 | 11/2012 | Wilson et al. | |
| 8,655,310 B1 * | 2/2014 | Katzer | H04M 1/72519 455/410 |
| 8,706,554 B1 | 4/2014 | Whitler | |
| 8,972,293 B2 | 3/2015 | Murphy et al. | |
| 9,224,146 B2 | 12/2015 | Hayhow | |
| 9,262,756 B2 | 2/2016 | Whitler | |
| 2002/0049632 A1 | 4/2002 | Parkinson | |
| 2002/0128967 A1 | 9/2002 | Meyer et al. | |
| 2002/0143655 A1 | 10/2002 | Elston et al. | |
| 2002/0186845 A1 * | 12/2002 | Dutta | G06F 17/30017 380/231 |
| 2003/0074316 A1 | 4/2003 | McCallum | |
| 2003/0126139 A1 | 7/2003 | Lee et al. | |
| 2003/0216969 A1 | 11/2003 | Bauer et al. | |
| 2004/0044627 A1 | 3/2004 | Russell et al. | |
| 2005/0004839 A1 | 1/2005 | Bakker et al. | |
| 2006/0116955 A1 | 6/2006 | Strayer et al. | |
| 2006/0229998 A1 | 10/2006 | Harrison et al. | |
| 2007/0124216 A1 | 5/2007 | Lucas | |
| 2007/0175984 A1 | 8/2007 | Khandaker et al. | |
| 2007/0288372 A1 | 12/2007 | Behar et al. | |
| 2007/0294318 A1 | 12/2007 | Arora et al. | |
| 2008/0208680 A1 | 8/2008 | Cho | |
| 2008/0270275 A1 | 10/2008 | McElroy et al. | |
| 2008/0275774 A1 | 11/2008 | Pepe et al. | |
| 2009/0063291 A1 | 3/2009 | Robbins et al. | |
| 2009/0108080 A1 | 4/2009 | Meyer et al. | |
| 2009/0119176 A1 | 5/2009 | Johnson | |
| 2009/0132312 A1 | 5/2009 | Reinheimer et al. | |
| 2009/0164331 A1 * | 6/2009 | Bishop | G06Q 20/02 705/19 |
| 2009/0222337 A1 | 9/2009 | Sergiades | |
| 2010/0153266 A1 | 6/2010 | Plunkett et al. | |
| 2010/0169170 A1 | 7/2010 | Fordyce, III et al. | |
| 2010/0205063 A1 * | 8/2010 | Mersky | G06Q 20/02 705/17 |
| 2010/0250379 A1 | 9/2010 | Giordano et al. | |
| 2010/0280948 A1 | 11/2010 | Cohen | |
| 2011/0054992 A1 | 3/2011 | Liberty et al. | |
| 2011/0078032 A1 | 3/2011 | Johnson | |
| 2011/0078034 A1 * | 3/2011 | Hayhow | G06Q 20/20 705/21 |
| 2011/0125564 A1 | 5/2011 | DeLillio | |
| 2011/0137789 A1 | 6/2011 | Kortina et al. | |
| 2011/0231314 A1 | 9/2011 | Sears et al. | |
| 2011/0302080 A1 | 12/2011 | White et al. | |
| 2011/0307359 A1 | 12/2011 | Gude et al. | |
| 2012/0029982 A1 | 2/2012 | Andrade | |
| 2012/0030045 A1 | 2/2012 | Smith, III | |
| 2012/0047007 A1 | 2/2012 | Halsey et al. | |
| 2012/0078790 A1 | 3/2012 | Ornce et al. | |
| 2012/0158566 A1 | 6/2012 | Fok et al. | |
| 2012/0271707 A1 | 10/2012 | Harrison et al. | |
| 2012/0271765 A1 | 10/2012 | Cervenka et al. | |
| 2013/0054465 A1 | 2/2013 | Sakata et al. | |
| 2013/0140358 A1 * | 6/2013 | Graef | G06Q 40/02 235/379 |
| 2014/0039999 A1 | 2/2014 | Levene et al. | |
| 2014/0046786 A1 * | 2/2014 | Mazaheri | G07G 1/0081 705/18 |
| 2014/0129424 A1 | 5/2014 | Murphy et al. | |
| 2014/0156473 A1 | 6/2014 | Murphy | |
| 2014/0188642 A1 | 7/2014 | Whitler | |
| 2014/0188705 A1 | 7/2014 | Whitler et al. | |
| 2015/0186861 A1 | 7/2015 | Glatt | |

OTHER PUBLICATIONS

"Interchange Profit Calculator" (http://www.greensheet.com/legacy/Interchange_Profit_Calculator.xls), The Green Sheet Inc., Santa Rosa, California, Aug. 1, 2012.

Djurdjevic, Nebo, "Commentary: Mobile payments and low value transactions" (http://www.mobilepaymentstoday.com/article/193382/Commentary-Mobile-payments-and-low-value-transactions), Mobilepaymentstoday.com, Networld Media Group (registrant), Louisville, Kentucky, Apr. 20, 2012.

Papadimitriou, Odysseas, "No Credit Cards for Purchases Under $10" (http://www.cardhub.com/edu/10-dollar-credit-card-payments/), Cardhub.com, Evolution Finance, Inc. (registrant), Arlington, Virginia, Sep. 2, 2011.

"Card security code" (http://en.wikipedia.org/wiki/Card_Code_Verification), Wikipedia.org, Wikimedia Foundation, Inc. (registrant), San Francisco, California, Sep. 27, 2012.

United States District Court for the Eastern District of New York, Proposed "Class Settlement Agreement," Document 1588-1, Case No. 05-MD-01720-JG-JO (in Re Payment Card Interchange Fee and Merchant Discount Antitrust Litigation), Jul. 13, 2012, Brooklyn, New York.

"Definition of 'Percentage' by the Free Online Dictionary," TheFreeDictionary.com, Jul. 24, 2013.

"19 Walmart Stores near '22314,'" Walmart.com, Jul. 24, 2013.

Seen at 11: Retailers Ready to Force Consumers to Pay 'Swipe Fee' for Using Plastic. Jul. 27, 2012. CBS 2. New York. Article posted at http://newyork.cbsglobal.com/2012/07/27/seen-at-11-retailers-ready-to-force-consumers-to-pay-swipe-fee-for-using-plastic/.

Meece, Mickey. Be Aware: Credit Card Purchases May Soon Carry a Surcharge. Jul. 13, 2012. Forbes.com. Article posted at http://www.forbes.com/sites/mickeymeece/2012/07/13/be-aware-credit-card-purchases-may-soon-carry-a-surcharge/.

Credit/Debit Card Interchange Fees and State Procurement. National Association of State Procurement Officials. Sep. 2012. Retrieved at: http://www.naspo.org/dnn/portals/16/documents/CreditDebit-Card-Interchange-Fees-And-State-Procurement.pdf.

Randall, David. Credit Card Companies Waive Fees for Some Haiti Donations. Forbes. Jan. 15, 2010. Retrieved at: http://www.forbes.com/sites/moneybuilder/2010/01/15/credit-card-companies-waive-fees-for-some-haiti-donations/.

* cited by examiner

| Brand | Surcharge | Exceptions |
|---|---|---|
| Bank 1 | .01 | Affinity A |
| Network 1 | .03 | Rewards B |
| Network 2 | $1.00 | ... |
| Bank 2 | .01 + 50¢ added to purchases under $10 | Transaction Network T |

1300 ↘

Transaction Record

| Pos Attributes $X_1...J$ | Surcharge Attributes $Y_1...K$ | Synoptic Attributes $Z_1...L$ |
|---|---|---|
| 1301 | 1302 | 1305 |

FIG. 13

Pos Attributes $X_{1...J}$

| Location | Time | Date | Amount | Number of Items | State/Province | Address | Checkout No. | Credit Card Type | MCC | ... | J |
|---|---|---|---|---|---|---|---|---|---|---|---|
| 1404 | 1406 | 1408 | 1410 | 1412 | 1414 | 1416 | 1418 | 1420 | 1422 | | |

↙ 1401

Synoptic Attributes $Z_{1...L}$

| Transaction Volume | Total Sales | Fiscal Period | Credit Card Payment Ratio | Transaction Frequency | Total Transactions- Credit Card Type | Average Transaction Cost | Credit Risk | ... | L |
|---|---|---|---|---|---|---|---|---|---|
| 1421 | 1423 | 1425 | 1427 | 1429 | 1433 | 1435 | 1437 | | |

Surcharge Record — 1500

| Location | Time | Purchase Amount | Total Surcharge Amount | Surcharge Fraction | Fixed Fee | Payment Instrument Presented | Merchant ID | Transaction Network | Issuer |
|---|---|---|---|---|---|---|---|---|---|
| 1503 | 1505 | 1507 | 1509 | 1511 | 1513 | 1515 | 1517 | 1519 | 1521 |

Surcharge Reference Values — 1501

| | |
|---|---|
| Merchant Identifier | 999-000-111 — 1523 |
| Payment Instrument Presented | Rewards Credit Card A — 1525 |
| Transaction Processing Network | Transaction Network B — 1527 |
| Max Allowable Surcharge Fraction | .01 — 1529 |
| Max Allowable Fixed Fee | 53¢ — 1531 |
| Transaction Cost for Rewards Card A | .004 + 50¢ — 1533 |
| Merchant Max Surcharge | .003 + 50¢ — 1535 |
| Payment Instrument Accepted @ Merchant ID: 999-000-111 | Transaction Network A<br>Transaction Network B<br>Bank D<br>Credit Union E — 1537 |

FIG. 15

Chargeback Record 1700

| Transaction ID | Item ID | Transaction Time | Transaction Date | Transaction Location | Merchant ID | Item Purchase Amount | Surcharge Refund | Surcharge Refund Fraction | Payment Instrument | Transaction Network | Issuer |
|---|---|---|---|---|---|---|---|---|---|---|---|
| AABB 1234 | 9876564 | 10:54 AM | 15-OCT-12 | 123 Main St. Anytown, US 12345 | 999-000-111 | $50.00 | 55¢ | .18 | Rewards Credit Card A | Transaction Network B | Bank C |

1703 / 1705 ← → 1709

Corresponding Transaction Record 1701

| Transaction ID | Merchant ID | Location | Time | Purchase Amount | Items Purchased | Total Surcharge Amount | Surcharge Fraction | Fixed Fee | Payment Instrument | Transaction Network | Issuer |
|---|---|---|---|---|---|---|---|---|---|---|---|
| AABB 1234 | 999-000-111 | 123 Main St. Anytown, US 12345 | 10:54 AM | $275.00 | 9876564; 1234556; 1478529; 3698521 | $3.00 | .01 | 0 | Rewards Credit Card A | Transaction Network B | Bank C |

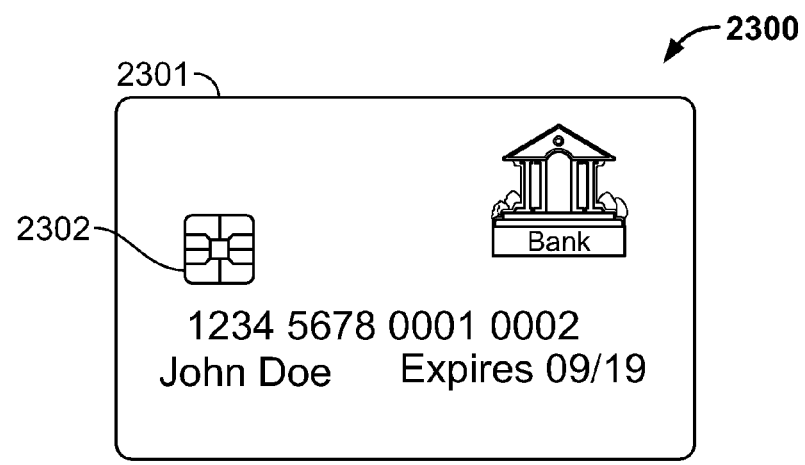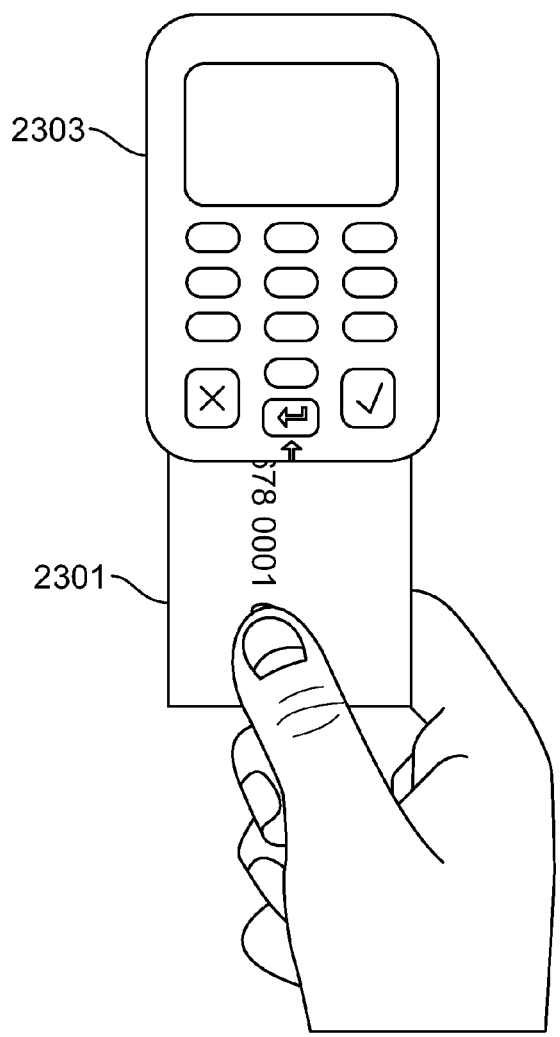
FIG. 23

REMOTE DISABLING OF TARGET POINT-OF-SALE ("POS") TERMINALS

CROSS-REFERENCE TO RELATED APPLICATIONS

This application is a continuation-in-part of U.S. patent application Ser. No. 14/476,958, filed on Sep. 4, 2014, which is a continuation of U.S. patent application Ser. No. 13/705,727, tiled on Dec. 5, 2012, now U.S. Pat. No. 8,972,293, both of which are hereby incorporated by reference in their entireties.

FIELD OF TECHNOLOGY

Aspects of the disclosure relate to providing apparatus and methods for determining compliance with surcharge rules in connection with a transaction between two or more transaction participants (hereinafter "TP").

BACKGROUND

In a transaction, a customer (the "customer") may purchase from a merchant ("the merchant") goods or services ("the product") using credit. The credit may be extended to the customer by an issuing bank (the "issuer"). The issuer may authorize the transaction before extending credit to customer. The merchant may present the transaction to an acquiring bank (the "acquirer"). Each transaction presented to the acquirer may be embodied in a transaction record. The acquirer pays the merchant for (and thus "acquires") the product. A transaction processing network in communication with the issuer and the acquirer settles the transaction between the issuer and the acquirer. The transaction processing network may collect transaction processing network fees from the issuer and the acquirer in connection with the settlement.

Settling the transaction may include the transaction network receiving a plurality of transactions from the acquirer. Each transaction may be embodied in a transaction record. Each of the plurality of transaction records may comprise an amount authorized by the issuer. In response to receiving the transaction records, the transaction network may debit an account of the issuer. The debit may correspond to the amount authorized by the issuer. The transaction network may credit an account of the acquirer. The amount credited to the acquirer may correspond to the amount authorized.

Settlement may include a transfer of funds between two or more TPs. The transfer may be a "book transfer," an inter-bank transfer or any suitable transfer between the TPs. A settlement network may transfer the funds between TPs. Illustrative settlement networks may include the Federal Reserve Wire Network ("Fedwire") and other suitable settlement networks that are well known to those of ordinary skill in the art. The settlement network may be any suitable network linking one or more accounts of TPs.

One TP may impose a transaction cost upon another TP for participating in the transaction. The transaction cost may be referred to as "interchange." Interchange may be a fixed fee and/or a percentage of the purchase amount. Interchange may be a fixed fee and/or a percentage of the transaction cost. Interchange may be determined based on one or more rules set by a TP.

Interchange flows from the acquirer, through the transaction processing network, to the issuer. For example, the issuer may transfer to the acquirer an amount net interchange. The issuer typically uses interchange to cover costs of acquiring credit card customers, servicing credit card accounts, providing incentives to retain customers, mitigating fraud, covering customer credit risk, group compensation and other expenses.

The acquirer may deduct a transaction cost from the amount that the acquirer pays the merchant in exchange for the product. The transaction cost may cover the acquirer's transaction processing network fee, interchange, and other expenses. The transaction cost may include a profit for the acquirer.

FIG. 1 shows typical credit card transaction settlement flow 100. Flow 100 involves TPs such as the merchant, the customer, and transaction service providers that are identified below. At step 1, the merchant provides information, relating to a proposed transaction between the merchant and a customer, to a transaction authorization and clearance provider. The transaction authorization and clearance provider may be a transaction processing network. The transaction authorization and clearance provider may provide transaction authorization and clearance information to the merchant. The transaction authorization and clearance information may include authorization for the transaction to proceed.

At step 2, the merchant provides $100 in product to the customer. The customer pays with a credit card. At step 3, the issuer transmits to the customer a statement showing the purchase price of ($100.00) due. The issuer collects the purchase price amount, along with interest and fees if appropriate, from the customer. At step 4, the issuer routes the purchase price amount of ($100.00) through the transaction processing network to the acquirer. At step 5, the acquirer partially reimburses the merchant for the purchase price amount. In the example shown in FIG. 1, the partial reimbursement is $98.00. The difference between the reimbursement amount ($98.00) and the purchase price amount ($100.00) is a two dollar ($2.00) transaction cost.

At step 6, the acquirer pays a transaction cost ($1.50), via the transaction processing network, to the issuer. At step 7, both the acquirer and the issuer pay a transaction cost ($0.07 for acquirer and $0.05 for the issuer) to the transaction processing network.

TABLE 1

Net positions, by participant, based on settlement flow 100 (shown in FIG. 1).

| Participant | Net ($) |
|---|---|
| Issuer | 1.45 |
| Acquirer | 0.43 |
| Transaction processing network | 0.12 |
| Merchant | −2.00 |
| Customer | 0 |

In settlement 100 (shown in FIG. 1), the transaction cost is based on an exemplary merchant discount rate of 2%. The $1.50 interchange is based on an exemplary interchange rate of 1.5%. The sum of the transaction processing network fees ($0.07 and $0.05) is based on a total exemplary transaction processing network fee rate of 0.12%.

Transaction processing networks and transaction processing network services are offered under trademarks known to those of ordinary skill in the art. Transaction processing networks may set interchange rates. Issuers may set interchange rates. Interchange rates may vary for each transaction processing network. Interchange rates may vary based on merchant type and size, transaction processing method, transaction volume and other factors.

A merchant, or other TP, may impose a surcharge for accepting a credit card, establish minimum or maximum purchase price amounts or refuse to accept selected payment credit cards. The surcharge may allow the merchant to recover some or all of the transaction cost charged to the merchant by other TPs. The surcharge imposed by the merchant may be determined and/or limited based on a total transaction cost associated with the transaction. The total transaction cost may include interchange, the merchant discount and network fees.

It would be desirable, therefore, to provide apparatus and methods for auditing a transaction for compliance with one or more surcharge rules.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIGS. 11-15 show illustrative information in accordance with the principles of the disclosure;

FIG. 17 shows illustrative information in accordance with the principles of the disclosure;

FIG. 23 shows an illustrative scenario and associated apparatus in accordance with the principles of the disclosure;

DETAILED DESCRIPTION OF THE DISCLOSURE

Apparatus and methods for performing an audit of a transaction are provided. The transaction may involve an acceptance of a payment instrument by a merchant. The transaction may involve a credit, debit, prepaid, automated clearing house, or any suitable payment method involving the transfer of funds from one TP to another.

The transaction may be a transaction in any state of completion. The transaction may be a prospective transaction. The prospective transaction may include the customer presenting the payment instrument to pay for the product. The prospective transaction may include the merchant collecting payment instrument information from the customer.

The transaction may be a pending transaction. For example, a transaction may be pending prior to receiving authorization from the issuer. The transaction may be pending during a time between receiving the authorization and settlement. The transaction may be pending during a time prior to collection, by the issuer, of the purchase amount from the customer.

The transaction may be an executed transaction. Executing the transaction may include a first TP passing the transaction along to a second TP. An executed transaction may include a transaction that has been authorized and settled.

Figure 1:
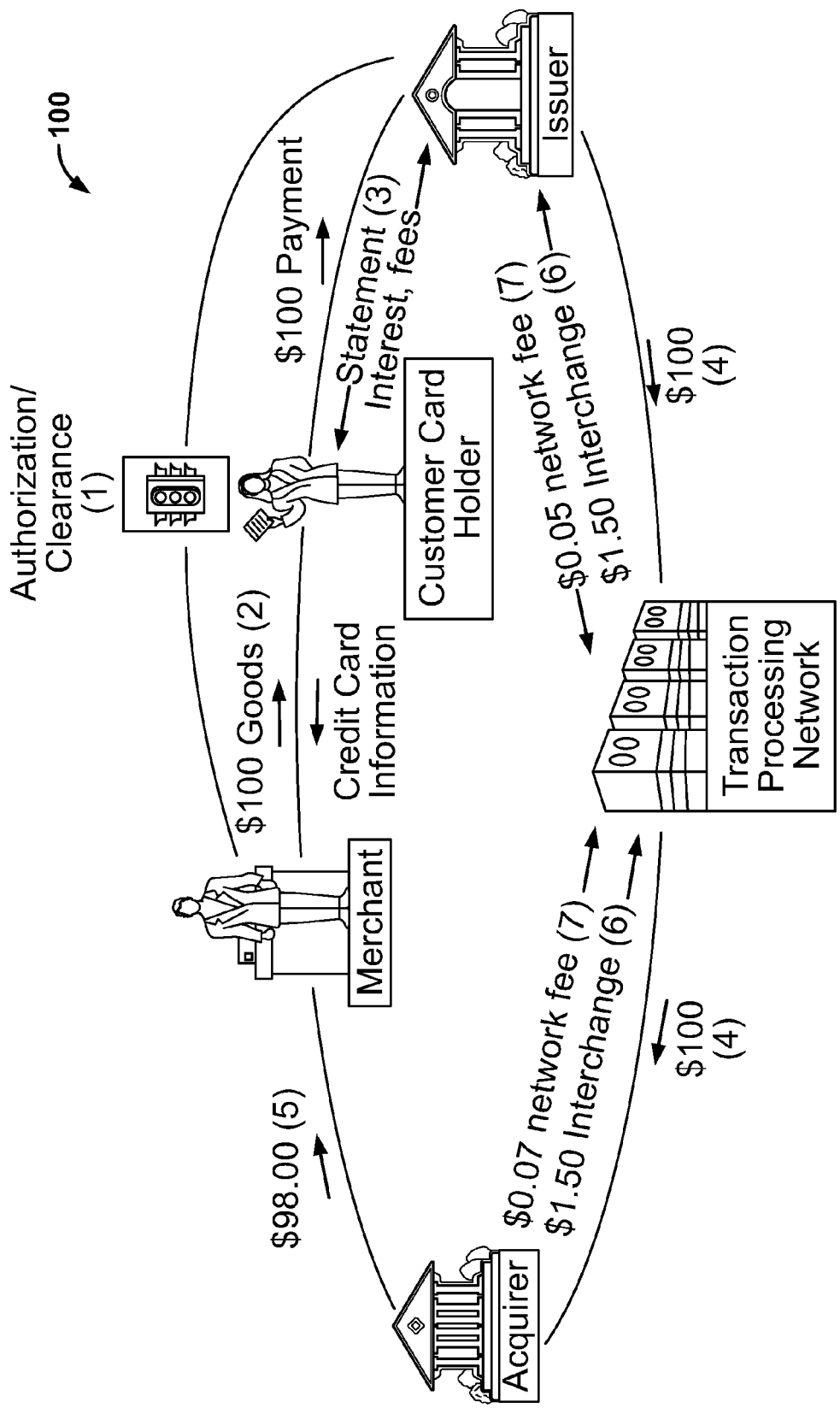
FIG. 1 shows a prior art scenario.

The transaction may be associated with one or more TPs providing transaction services. Each transaction service may be performed by a TP. In some circumstances, a participant may perform more than one of the services. Each participant may charge a fee for providing the service. The fee may be charged to one or more of the other participants (as shown in FIG. 1). Table 2 shows illustrative TP types.

TABLE 2

| Illustrative transaction participant types. Illustrative TP Types |
| --- |
| Merchant |
| Customer |
| Authorization service provider |
| Clearance service provider |
| Settlement service provider |
| Issuer |
| Network |
| Acquirer |
| Transaction broker |

More than one participant of a given type may be available to participate in the transaction. Different participants of the same type may have advantages and/or disadvantages relative to the other participants of that type. For example, one issuer may be a member of a lending consortium while another is not a member, one transaction processing network may require payment of a relatively small interchange fee while another network may require payment of a relatively large interchange fee, and the like.

Illustrative transaction services are listed in Table 3.

TABLE 3

| Illustrative transaction services. Illustrative Transaction Service |
| --- |
| Sale of goods to customer |
| Authorization of customer credit |
| Clearance of customer credit |
| Notice of customer balance |
| Invoice of customer for bank service |
| Invoice of network fee |
| Invoice of interchange fee |
| Matching of acquirer and issuer |
| Acquisition of goods |
| Collection of balance from customer |

TABLE 3-continued

Illustrative transaction services.
Illustrative Transaction Service

Settlement of merchant account
Transfer of funds to acquirer
Debit of funds from issuer The payment instrument may include a credit card and/or other forms of payment instruments. Such other forms of payment instruments may include: cash, a check, a debit card, credit card, an instrument or device that includes a chip, such as an ISO14443-compliant contactless chip, a smart phone, a tablet computer, a transponder or any other suitable electronic purchasing devices. Payment instruments may store data in a magnetic strip, a bar code, a silicon chip, non-volatile computer readable media or any other suitable data storage device or format. The merchant may provide a point-of-sale ("POS") terminal that is configured to receive data from, provide data to, or exchange data with the payment instrument.

The payment instrument may be presented to the merchant by the customer as payment for the product. A transaction cost may be associated with acceptance, by the merchant, of the payment instrument as a form of payment. The transaction cost may be an acceptance cost associated with the payment instrument.

The acceptance cost may include a fee a merchant pays to other TPs. The fee may enable the merchant to accept a payment instrument as form of payment for a product. Payment of the fee may enable the merchant to transmit/receive payments to/from a transaction network or acquirer associated with the payment instrument.

A TP (hereinafter "TP") that pays transaction fees to other TPs may impose a surcharge to recoup one or more transaction fees. The surcharge may correspond to an amount charged in addition to a product price. The surcharge may be associated with a particular payment instrument.

The TP may impose the surcharge to generate a revenue stream. The TP may impose the surcharge on any other suitable TP. For example, the TP may impose the surcharge on a customer or acquirer.

The surcharge may be defined by one or more surcharge attributes. The surcharge attribute may be any suitable attribute of the surcharge. For example, a surcharge amount may be a surcharge attribute. The surcharge amount may correspond to an amount charged by a TP to accept a payment instrument. The surcharge amount may be charged to a customer that pays for a product using the payment instrument. The surcharge amount may be charged to the customer by a merchant that accepts the payment instrument as a form of payment. The surcharge amount may correspond to all or a portion of the merchant discount paid by the merchant.

The surcharge amount may be determined based on a percentage of the purchase amount. The surcharge amount may be determined based on a percentage of the transaction cost. The surcharge amount may be a flat fee. The surcharge amount may be a combination of a flat fee and a percentage of the purchase amount. The surcharge amount may be any suitable monetary amount.

For example, a surcharge imposed by a merchant may be associated with surcharge attributes corresponding to a surcharge amount, a region, a MCC and a payment instrument. Based on the surcharge attributes, a surcharge may be imposed on a purchase made within the region at the location associated with the MCC using the payment instrument.

The surcharge attribute may include a surcharge fraction (hereinafter "SF"). The surcharge amount may be determined based on the surcharge fraction. The surcharge amount may correspond to a fractional portion of the transaction cost. The surcharge amount may correspond to a fractional portion of the purchase amount.

The fractional portion may be a product of the SF and the transaction cost. An exemplary SF may be defined by $0 \leq SF \leq 1$. For example, if the SF is 0.3, the fractional portion may be approximately ⅓ of the transaction cost. The SF may be determined based on a performance metric. The SF may be associated with a transaction attribute.

The SF may be one. When the SF is one, the surcharge may correspond to the entire transaction cost. The SF may be zero. A SF of zero may correspond to no imposition of a surcharge. When the SF is one, the customer may bear the transaction cost. When the SF is zero, the merchant may bear the transaction cost. When the SF is between zero and one, the transaction cost may be shared by the merchant and customer.

The surcharge attribute may include a type of the payment instrument. The type of payment instrument may correspond to a brand associated with the payment instrument. The brand may correspond to a transaction processing network that processes transactions initiated using the payment instrument. The type of payment instrument may correspond to a product-type associated with the payment instrument. The product-type may correspond to a "rewards card" or other suitable features of the payment instrument. The TP may impose a surcharge based on specific attributes associated with the brand and/or product-type.

Exemplary surcharge attributes are listed below in Table 4.

TABLE 4

Illustrative Surcharge Attributes.
Illustrative Surcharge Attributes

Surcharge fraction
Total surcharge amount
Fixed fee amount
Payment instrument
Payment instrument product type
Merchant category code
Product stock keeping unit ("SKU")
Transaction network
Issuer
Surcharge imposition start time
Surcharge imposition end time
Transaction location
Transaction time The transaction may be associated with one or more transaction attributes. The transaction cost may be based on the one or more of the transaction attributes. The transaction record may include one or more surcharge attributes. A surcharge attribute may include one or more characteristics of a transaction attribute.

A transaction record may be generated based on transaction attributes received and/or available at a time of purchase. Each transaction record may include one or more fields. Each field may include an attribute associated with the transaction. The attribute may be represented by a value. The value may be stored in the field of the transaction record.

Table 5 shows illustrative transaction attributes and associated values.

TABLE 5

Illustrative transaction attributes and associated values.

| Illustrative Transaction Attributes | Illustrative Associated Value |
| --- | --- |
| Geographic | Longitude/latitude |
| | GPS coordinates |
| | Map coordinates |
| | Elevation |
| | Depth |
| | Distance from a point |
| | Address |
| | Zip code |
| | Area code |
| | County |
| | State |
| | Country |
| | IP address |
| | Signal triangulation |
| Temporal | Seconds |
| | Minutes |
| | Hours |
| | Day |
| | Week |
| | Month |
| | Year |
| | Duration |
| Synoptic | Weather at time of transaction |
| | Stock market performance at time of transaction |
| | Political party in power at time of transaction |
| | TP credit risk |
| Transaction amount | Dollars |
| | Available credit |
| | Currency |
| | Foreign exchange rate |
| | Low value purchase |
| Number of items purchased | Number |
| | Number of distinct stock keeping units ("SKU") |
| | Purchase amount per item |
| Merchant category code | Numerical identifier |
| | Taxation status |
| | Associated acquirer |
| Surcharge | Surcharge amount |
| | Surcharge fraction |
| | Maximum surcharge |
| | Minimum surcharge |
| | Percentage of purchase |
| | Fixed amount |
| Payment instrument identifier | Brand |
| | Rewards |
| | Transaction Network |
| | Issuer |
| | Affinity |
| Loyalty program | Rewards/point balance |
| | Membership level |
| | Duration of membership |
| | Frequency of use |
| Access Channel | Point-of-sale |
| | Automated teller machine |
| | Online portal |
| | Self-service kiosk |
| | Mobile device |
| | In person |

Surcharge Compliance Registry

Apparatus and methods may include one or more non-transitory computer-readable media storing computer-executable instructions. The computer executable instructions, when executed by a processor on a computer system, may perform a method for determining a surcharge compliance score.

The methods may include receiving a surcharge compliance record ("SCR"). The SCR may be received from a mobile device. The methods may include receiving a proof-of-compliance record ("POCR"). The POCR may be received from the mobile device. The POCR may include proof of information in the SCR. The methods may include determining a compliance score based on the SCR and/or the POCR. The compliance score may be made available to the public. The compliance score may be posted on a website.

The SCR may include a plurality of compliance attributes. Each compliance attribute may be represented by a value. The compliance attributes may correspond to a surcharge amount, a purchase amount, a payment instrument identifier, a merchant identifier or any suitable transaction attribute. The compliance attribute may correspond to a transaction attribute.

For example, a customer may purchase a product from a merchant. The merchant may impose a surcharge on credit card transactions that occur at a merchant location. The merchant location may be any suitable location such as a "brick and mortar" location or an e-commerce website. After purchasing the product and paying the surcharge, the customer may report whether the surcharge was properly imposed on the transaction.

To create the SCR, the customer may open an application on a mobile device. The application may present a digital form to the customer. The application may present the digital form to the customer based on a detected location of the customer. For example, the location of the mobile device may indicate that the customer is at the detected location. Based on the detected location, the customer may be prompted to complete the digital form. Based on the detected location, the customer may not be prompted to enter a location where the transaction occurred. Location information may be pre-filled in the form when the customer opens the form.

As a further example, a customer may pay for a purchase by presenting credit card information stored on a mobile device. The mobile device may transmit the credit card information to a merchant's point-of-sale device. After the customer confirms the transaction, the mobile device may prompt the customer to complete a SCR. The mobile device may present the digital form to the customer.

The digital form may prompt the customer to confirm whether the surcharge was properly determined. The digital form may prompt the customer to enter one or more surcharge attributes. The digital form may prompt the customer to confirm whether the merchant posted signs informing patrons that a surcharge will be imposed on a transaction. The customer may complete the digital form and transmit the form. By submitting the form, the customer may indicate that the merchant or other TP has properly imposed a surcharge.

The digital form may include pre-filled information. The pre-filled information may include one or more transaction attributes. The pre-filled information may be determined based on a detected location of the mobile device. The pre-filled information may be determined based on a detected time, such as a time of submission of a completed form.

In some embodiments, the customer may swipe a credit card, or other payment instrument, at a merchant's point-of-sale terminal. In some embodiments, the customer may enter credit card information into an online form when checking out of an e-commerce website. The digital form may be presented to the customer as part of the checkout process. The digital form may display the maximum allowable surcharge and prompt the customer to confirm that the merchant has not imposed a surcharge greater than the maximum. The customer confirmation may be a compliance attribute.

The form may be received by an entity that tracks surcharge compliance. The entity may be a TP such as an acquirer or a third party. To support the customer's confirmation that the surcharge is proper, the POCR may be attached to the SCR.

The POCR may include an image, a location stamp, a time stamp or any suitable information. For example, the customer may photograph a sign posted by the merchant. The sign may display one or more surcharges currently in effect at a merchant location. The sign may display a surcharge that will be imposed at a future time.

The customer may photograph a receipt issued by the merchant. The receipt may include one or more transaction attributes. For example, the receipt may include a payment instrument and surcharge amount imposed on the transaction.

The methods may include identifying a segment of the image. The methods may include extracting information from the segment. The extracted information may correspond to a transaction attribute. For example, a customer may obtain an image of a receipt. The receipt image may include a plurality of segments. A segment may be demarcated by a label. The label may indicate what type of information may be obtained from the segment. If a segment includes a "time" label, a transaction attribute corresponding to a time value may be extracted from the segment.

Determining the compliance score may include comparing a compliance attribute of the SCR to a transaction attribute extracted from a segment of the proof-of-compliance record. For example, a customer may assert in the SCR, that at a specified merchant location, a surcharge has been properly imposed on a transaction. A segment of a receipt image may be identified. The segment may correspond to an address. The extracted address may be compared to the specified merchant location. The extracted address may confirm that the receipt was issued at the specified merchant location.

The methods may include determining an authenticity score based on the comparing. The methods may include determining the compliance score preferably only when the authenticity score is above a threshold.

Determining the compliance score may include receiving a first surcharge attribute. The first surcharge attribute may be received from a TP or any suitable party. The methods may include comparing a second surcharge attribute to the first surcharge attribute. The second surcharge attribute may be extracted from a segment of the proof-of-compliance record. The second surcharge attribute may be extracted from a segment of the image.

For example, the customer may assert in a SCR that a merchant has imposed a proper surcharge amount to a transaction. A segment of a receipt image may be identified. A payment instrument type may be extracted from the segment. Based on a set of surcharge rules the extracted payment instrument type may be identified as being surchargeable. Based on a set of surcharge rules the extracted payment instrument type may be identified as being unsurchargeable.

The set of surcharge rules may include one or more surcharge rules. A surcharge rule may be any requirement imposed on a transaction. The surcharge rule may be any rule that effects a determination of one or more surcharge attributes. The surcharge rule may be set by a TP or a third party such as a federal or state government.

Based on the extracted payment instrument type, the SCR assertion may be corroborated. For example, credit cards may be surchargeable and debit cards may be unsurchargeable. If the customer submits a SCR and the extracted payment instrument type corresponds to debit card, the SCR may be disregarded.

The methods may include determining the surcharge compliance score based on comparing the second surcharge attribute to the first surcharge attribute. When the first surcharge attribute corresponds to the second surcharge attribute, the surcharge indicated in the SCR may be classified as "compliant." When the first surcharge attribute does not correspond to the second surcharge attribute, the surcharge indicated in the SCR may be classified as "non-compliant." A compliant surcharge may be assigned a higher score than a non-compliant surcharge. A SCR that is not corroborated by an attached POCR may be disregarded and may have no effect on the compliance score.

Determining the compliance score may include identifying a reported surcharge. The reported surcharge may be identified based on the SCR and/or the POCR. The reported surcharge may be identified based on information extracted from the segment of an image.

To identify the reported surcharge, the methods may include identifying a plurality of transaction attributes. The transaction attributes may be identified based on the SCR and/or the POCR. The identified transaction attribute may correspond to a surcharge amount. The reported surcharge may include the identified surcharge amount.

The methods may include determining a maximum allowable surcharge. The methods may include comparing the reported surcharge to the maximum surcharge. The compliance score may be determined based on whether the reported surcharge is greater than or less than the maximum surcharge.

The maximum surcharge may be determined based on a transaction attribute. The maximum surcharge may be determined based on a set of surcharge rules. A transaction processing network may define a surcharge rules. A government agency may define surcharge rules. The surcharge rules may define one or more surcharge attributes.

The maximum allowable surcharge may be determined based on a plurality of transaction attributes and the set of surcharge rules. Exemplary transaction attributes may include a transaction location, payment instrument or a merchant category code ("MCC").

The methods may include adjusting a compliance rating. The compliance rating may be associated with a TP. The compliance rating may be associated with a merchant. The compliance rating may be associated with a merchant location. The compliance rating may be based on a plurality of compliance scores. The compliance rating may be determined based on the compliance score. The compliance rating may be published and made available to the public.

For example, a merchant may submit an entry to an online surcharge registry. The entry may assert that the merchant will not surcharge transactions. Customers may submit SCRs confirming that the merchant does not surcharge. Customers may submit SCRs asserting that the merchant is imposing a surcharge. Based on the submitted SCRs, the merchant's compliance rating may be adjusted. If the SCRs confirm that the merchant is not surcharging, the merchant may receive a first compliance rating. If the SCRs indicate that the merchant is surcharging the merchant may be assigned a second compliance rating. The adjustment to the compliance rating may depend on a number of SCR received. The adjustment to the compliance rating may depend on corroborating information included in a number of POCRs attached to the SCRs.

Apparatus may include an article of manufacture that includes a non-transitory computer usable medium. The computer usable medium may have computer readable program code embodied therein. The program code, when executed by a processor may cause a computer to certify a surcharge behavior.

The surcharge behavior may be exhibited by a TP. Monitoring the surcharge behavior may include tracking one or more surcharge attributes associated with a surcharge. For example, monitoring the surcharge behavior may include monitoring the surcharge fraction imposed by a merchant on one or more payment instrument transactions.

The surcharge behavior may correspond to a surcharge schedule. The surcharge schedule may be implemented by a TP. For example, a merchant may impose the surcharge schedule on customers that shop at one or more merchant locations. The one or more merchant locations may be "brick and mortar" locations, online locations, mobile locations or any suitable location.

For example, a merchant may deploy sales agents at a location. The location may be a trade show, an entertainment event, a political rally or other temporary venues. The merchant may process transactions at the temporary venue using a mobile device. The merchant may offer special or promotional pricing scheme at the temporary venue. The promotional pricing may include no surcharging at the temporary venue.

The surcharge behavior at the temporary venue may be associated with a transaction attribute corresponding to a geographic region. The surcharge behavior at the temporary venue may be associated with a transaction attribute corresponding to a mobile device configured to process transactions at the temporary venue.

The surcharge schedule may include imposing the surcharge at a designated time. The schedule may include defining a price of a product if payment is made by a payment instrument. The schedule may indicate a "turn on" time and a "turn off" time associated with the surcharge. The merchant may "turn on" a surcharge during morning hours, "turn off" the surcharge during afternoon hours and "turn on" the surcharge during evening hours. The merchant's surcharge behavior may correspond to the surcharge schedule. The surcharge behavior may be monitored during a time period.

The program code may cause the computer to receive a transaction record from a merchant. The program code may cause the computer to determine a maximum surcharge. The maximum surcharge may be determined based on the transaction record. The maximum surcharge may be determined based on one or more transaction attributes of the transaction record. The maximum surcharge may be determined based on a plurality of transaction attributes. The plurality of transaction attributes may include a location, a time, a payment instrument or any suitable transaction attribute.

The program code may cause the computer to identify a payment instrument attribute within the received transaction record. The program code may cause the computer to determine a transaction cost associated with the payment instrument attribute. The program code may cause the computer to determine the maximum surcharge based on the transaction cost.

The program code may cause the computer to receive a surcharge schedule from the merchant. The program code may cause the computer to identify a plurality of payment instruments associated with the surcharge schedule. The program code may cause the computer to determine the maximum surcharge based on a plurality of transaction costs. Each of the transaction costs may be associated with one of the plurality of payment instruments. Each transaction cost may be set by a transaction processing network affiliated with the corresponding payment instrument.

For example, a merchant may accept payment instruments associated with four transaction processing networks. A surcharge rule may state that a merchant not impose a surcharge that is greater than a transaction cost associated with any one of the four transaction processing networks. The transaction cost may be the lowest cost transaction processing network. The maximum surcharge may be determined based on the transaction cost corresponding to the lowest cost payment instrument.

As a further example, a first surcharge rule may state that a merchant may not treat payment instrument "A" different than a debit card transaction. Government regulations may forbid the merchant from imposing a surcharge on debit card transactions. A second surcharge rule may state that the merchant may not treat payment instrument "B" different than payment instrument "A."

The merchant may violate the first surcharge rule and impose a surcharge on transactions associated with payment instrument "A." Because the merchant violated the first surcharge rule, the merchant will not violate the second surcharge rule if the merchant imposes a surcharge on transactions associated with payment instrument "B." Apparatus and methods may be configured to ignore surcharge violations resulting from a violation of the first surcharge rule. Apparatus and methods may be configured to identify surcharge violations associated with the second surcharge rule.

As yet a further example, the merchant may select a first transaction processing network to route a transaction. The transaction cost charged by the first transaction processing may allow the merchant to charge the greatest surcharge amount. The merchant's selection of the first transaction processing network may be based on violating one or more terms of an agreement with a second transaction processing network.

Apparatus and methods may be configured to ignore surcharge violations resulting from a violation of an agreement between the merchant and the second transaction processing network. Apparatus and methods may be configured to ignore surcharge violations resulting from a violation of an agreement between the merchant and a TP other than the customer. Apparatus and methods may be configured to identify surcharge violations resulting from a violation of an agreement between the merchant and the customer.

The program code may cause the computer to identify a payment instrument attribute within the received transaction record. The program code may cause the computer to determine a transaction cost associated with the payment instrument attribute. The program code may cause the computer to determine the maximum surcharge based on the transaction cost.

For example, the payment instrument attribute may correspond to a payment instrument associated with a transaction processing network. Illustrative payment instrument attributes are shown below in Table 6.

TABLE 6

Illustrative payment instrument attributes
Illustrative Payment Instrument Attributes Brand (i.e., issuer, transaction network, acquirer)
Customer name
Expiration date
Card security code ("CSC")
Card verification data ("CVD")
Card verification value ("CVV," "CVV2," "iCVV" or "Dynamic CVV")
Card verification value code ("CVVC")
Card verification code ("CVC" or "CVC2")
Verification code ("V-code")
Card code verification ("CCV")
Signature panel code ("SPC")
Customer identification number ("CID")
Card account number
Affinity
Product (i.e., rewards card, platinum card, signature card, ect.)

The program code may cause the computer to determine an imposed surcharge. The imposed surcharge may be determined based on the transaction record. The program code may cause the computer to compare the maximum surcharge to the imposed surcharge. The program code may cause the computer to transmit a surcharge certification. The surcharge certification may be transmitted when the imposed surcharge is less than the maximum surcharge.

The program code may cause the computer to print the surcharge certification. The surcharge certification may be printed on a receipt. The receipt may be issued to a customer. For example, a printed surcharge certification may state: "The surcharge amount displayed on this receipt is certified COMPLIANT by TP 'A.'"

The program code may cause the computer to display a barcode. The barcode may be a two-dimensional barcode. The barcode may be a quick response ("QR") code or any other suitable barcode. The two-dimensional barcode may encode the surcharge certification. The two-dimensional barcode may be readable by a mobile device. The two-dimensional barcode may convey that the receipt includes a certified surcharge amount. The two-dimensional barcode may convey that the receipt includes a surcharge amount that has been certified by a TP or third party audit.

The program code may cause the computer to monitor a number of surcharge certifications associated with the merchant. A surcharge certification may be issued for each transaction that complies with a set of surcharge rules. The program code may cause the computer to monitor a number of transactions associated with the merchant. The number may correspond to transactions processed by a TP during a pre-determined time period. The computer may determine whether each transaction processed by the TP meets a requirement for a surcharge certification.

The program code may cause the computer to determine a compliance score based on the number of certifications. The program code may cause the computer to determine a compliance score. The compliance score may be based on a ratio of the number of surcharge certifications issued and the number of transactions. The compliance score may reflect a compliance rate of a TP with the set of surcharge rules.

The program code may cause the computer to upload the compliance score to a website. The program code may cause the computer to display the compliance score on the website.

The program code may cause the computer to receive a receipt. The receipt may be a transaction record. The receipt may be issued by a TP. The receipt may be issued by a merchant as a proof of purchase. The receipt may include a surcharge amount. The surcharge amount may correspond to an amount of funds paid by the customer for using a specific payment instrument to pay for the purchase.

The program code may cause the computer to determine a transaction cost. The transaction cost may be determined based on the received transaction record. The program code may cause the computer to compare the transaction cost to the surcharge amount. A first surcharge rule may require that a surcharge amount not be greater than a transaction cost associated with a payment instrument. A second surcharge rule may require that a surcharge amount not be greater than a maximum surcharge amount. The maximum surcharge amount may be less than the transaction cost. The program code may cause the computer to transmit the surcharge certification when the surcharge amount is less than the transaction cost, and the surcharge amount is less than the maximum surcharge.

Apparatus may include an article of manufacture comprising a non-transitory computer usable medium having computer readable program code embodied therein. The program code, when executed by a processor may cause a computer to generate a surcharge compliance report.

The program code may cause the computer to receive a request for a surcharge compliance report. The request may be received from a mobile device.

The compliance report may include the compliance rating. The compliance report may include the compliance score. The compliance report may include an assessment of a TP's surcharge behavior. The compliance report may include a current surcharge imposed at a merchant location.

The program code may cause the computer to determine a location of the mobile device. The location may be determined based on a GPS signal received by the mobile device. The location may be determined based on signal triangulation.

The program code may cause the computer to correlate the location to a plurality of merchant locations. For example, a merchant may be required to register with a central authority prior to imposing surcharge. The merchant may submit to the central authority merchant locations where a surcharge will be imposed on transactions. Based on the location determined by the mobile device, the computer may determine if the mobile device is at a registered location.

The program code may cause the computer to receive a confirmation from the mobile device. The confirmation may correspond to at least one of the plurality of merchant locations. For example, the mobile device may be in a vicinity of multiple registered locations. Each registered location may be associated with a different merchant. The mobile device may be located in mall that includes a plurality of registered locations.

In response to a request for a surcharge compliance report, the mobile device may receive a list of registered merchant locations. The list may include the plurality of merchant locations. A user of the mobile device may select one of the registered locations. The user of the mobile device may sort the list of registered locations. The list may be sorted from highest surcharge to lowest surcharge.

The program code may cause the computer to generate a surcharge compliance report associated with the at least one of the plurality of merchant locations. The compliance report may be generated for the selected merchant location. The program code may cause the computer to transmit the surcharge compliance report to the mobile device.

The request may include a plurality of surcharge attributes. Each surcharge attribute may be associated with one of the plurality of payment instruments. The plurality of payment instruments may be stored on the mobile device. The surcharge compliance report may include a plurality of compliance scores. Each of the compliance scores may be associated with a merchant. Each of the compliance scores may be associated with a merchant and one of the plurality of payment instruments.

For example, the mobile device may store information corresponding to three payment instruments. A user of the mobile device may pay for a purchase by transmitting payment instrument information to a point-of-sale device of a merchant. The user may wish to receive a compliance report that includes information relating to each of the three payment instruments held by the user. The user may wish to receive a report that includes a compliance score or compliance rating corresponding to a merchant's surcharge behavior with respect to at least one of the three payment instruments.

The program code may cause the computer to receive a surcharge compliance rating from the mobile device. For example, the user of the mobile device may submit a SCR and/or POCR in response to receiving a surcharge compliance report. The user may wish to confirm that the merchant is properly applying a surcharge. The user may wish to inform the central authority of an irregularity in a surcharge behavior of a merchant. The irregularity may correspond to a surcharge violation.

When a request for a surcharge compliance report is a first request, a response to a second request for the surcharge compliance report may be based on the surcharge compliance rating. For example, a surcharge compliance report may include an option for the viewer to submit feedback on the report. When a user of the mobile device transmits feedback to the surcharge compliance report, a subsequent surcharge compliance report may be based on the feedback received from the user. The feedback may include reporting a surcharge violation. The feedback may include reporting surcharge compliance.

Apparatus may include an article of manufacture comprising a non-transitory computer usable medium having computer readable program code embodied therein. The code when executed by a processor causes a computer to determine a maximum surcharge.

The program code may cause the computer to receive a transaction record from a merchant. In response to receiving the transaction record, the program code may cause the computer to receive a first surcharge from a first transaction processing network. In response to receiving the transaction record, the program code may cause the computer to receive a second surcharge from a second transaction processing network.

The first and second surcharges may be received from a transaction broker. The first surcharge may be the largest magnitude surcharge that may be imposed under a surcharge rule imposed by the first transaction network. The second surcharge may be the largest magnitude surcharge that may be imposed under a surcharge rule imposed by the second transaction network.

The program code may cause the computer to compare the first surcharge to the second surcharge. The program code may cause the computer to set the maximum surcharge equal to the first surcharge. The program code may cause the computer to set the maximum surcharge equal to the first surcharge when the first surcharge is greater than the second surcharge. The program code may cause the computer to set the maximum surcharge equal to the second surcharge. The program code may cause the computer to set the maximum surcharge equal to the second surcharge when the second surcharge is greater than the first surcharge.

In response to receiving the transaction record, the program code may cause the computer to receive a plurality of surcharges. The plurality of surcharges may be received from a plurality of transaction processing networks. Each surcharge included in the plurality of surcharges may be the largest magnitude surcharge allowed by a corresponding transaction processing network. The plurality of surcharges may be received from a transaction broker. The program code may cause the computer to rank the plurality of surcharges. The plurality of surcharges may be ranked in order of magnitude. The magnitude may include a surcharge fraction. The magnitude may include a fixed fee.

The program code may cause the computer to select the surcharge having the greatest magnitude. The program code may cause the computer to set the maximum surcharge equal to the surcharge having the greatest magnitude.

Surcharge Violation Registry

Apparatus and methods for reporting a surcharge violation are provided. The surcharge violation may correspond to an imposed surcharge that does not follow a surcharge rule. The surcharge rule may be one of a set of surcharge rules.

The surcharge rule may be set by a TP, such as a transaction processing network. For example, the surcharge rule may state that all payment instruments accepted by a merchant must be identically surcharged. The surcharge rule may state that credit card transactions may only be surcharged in the same manner as a debit card transaction. The surcharge rule may state that an imposed surcharge not exceed a transaction cost associated with a payment instrument used in the transaction. The surcharge rule may be any suitable surcharge rule.

The surcharge rule may be set by a government or a government agency. For example, a state may pass a law that forbids imposing a surcharge on credit card transactions. The surcharge violation may correspond to a surcharge being imposed on a credit card transaction in the state. A federal government may pass a law that forbids imposing a surcharge on a debit card transaction.

The method may include receiving an image of a transaction receipt. The image may be received from a mobile device. The method may include determining one or more surcharge attributes.

The one or more surcharge attributes may correspond to a location, a time, a total surcharge amount, a surcharge fraction, a fixed fee, a purchase amount, a payment instrument, a merchant or any suitable surcharge attribute.

Determining the one or more surcharge attributes may include extracting information from the image. The information may be extracted from a segment of the image. The information may correspond to a payment instrument identifier, a merchant identifier, a surcharge amount, a purchase amount or any suitable information.

For example, a customer may purchase a product through an e-commerce website of a merchant. The merchant may transmit an electronic receipt to the customer. The electronic receipt may include a surcharge amount imposed on the transaction. The surcharge amount may be extracted from the electronic receipt.

The method may include comparing at least one surcharge attribute to at least one surcharge reference value. The method may include identifying the surcharge violation based on the comparing. The comparing may include comparing at least three of the surcharge attributes to at least three surcharge reference values.

The one or more or more surcharge reference values may correspond to a first surcharge cap. The first surcharge cap may be associated with a payment instrument identifier. The first surcharge cap may be based on a transaction cost associated with the payment instrument identifier. The one or more or more surcharge reference values may correspond to a second surcharge cap. The second surcharge cap may be associated with a merchant identifier. The first and second surcharge caps may be set by a one or more surcharge rules. The first and second surcharge caps may be set by one or more government regulations or laws.

A surcharge reference value may correspond to a maximum surcharge. The maximum surcharge may be defined by one or more surcharge rules. The maximum surcharge may be equal to the lesser of the first surcharge cap or the second surcharge cap. The maximum surcharge may include a surcharge fraction. The maximum surcharge may include a fixed fee.

The surcharge reference value may correspond to a maximum surcharge amount. The maximum surcharge amount may be determined based on the maximum surcharge and the purchase amount. For example, when the maximum surcharge corresponds to a surcharge fraction, the maximum surcharge amount may be a product of the surcharge fraction and the purchase amount.

The comparing may include comparing the maximum surcharge amount to the surcharge amount. The surcharge violation may be identified when the surcharge amount exceeds the maximum surcharge amount. A surcharge amount that exceeds the maximum surcharge amount may violate one or more surcharge rules.

The method may include receiving a surcharge notice. The surcharge notice may be received from a merchant, an acquirer or any suitable TP or third party. The methods may include determining an advertised surcharge. The advertised surcharge may be determined based on information contained in the surcharge notice.

The surcharge notice may include one or more attributes of an advertised surcharge. For example, the surcharge notice may include a surcharge schedule. The surcharge schedule may include one or more surcharges imposed during a period of time. The surcharge notice may include a surcharge fraction associated with each surcharge. The surcharge notice may include a time when each surcharge may be imposed. The surcharge notice may include a payment instrument that may trigger imposition of a surcharge.

The method may include comparing the advertised surcharge to one or more surcharge reference values. The method may include identifying the surcharge violation based on the comparing. The surcharge violation may correspond to an imposed surcharge that is different from the advertised surcharge. The advertised and imposed surcharge may differ with respect to any suitable surcharge attribute.

For example, an imposed surcharge may include a fixed fee that is greater than the fixed fee associated with the advertised surcharge. The imposed surcharge may have been imposed on a transaction during a time period when the advertised surcharge would not have been imposed. As a further example, the imposed surcharge may have been imposed on a payment instrument that is not associated with the advertised surcharge.

The method may include transmitting the surcharge violation to a TP. For example, the surcharge violation may be transmitted to a customer. Upon being informed of the surcharge violation the customer may be offered an option to abort the transaction.

The method may include transmitting a disable signal in response to a surcharge violation. For example, when a surcharge violation is detected, a disable signal may be transmitted to the device that detected and/or transmitted the surcharge violation. The device may be a point-of-sale device. The device may be any suitable device for determining a surcharge. The disable signal may prevent operation of the device. A device that receives a disable signal may be re-enabled when a method for determining the surcharge has been corrected.

As a further example, in response to detecting imposition of an erroneous surcharge, a POS terminal used to impose an erroneous surcharge may be disabled. Disabling the POS terminal may include powering down the POS terminal. The POS terminal may be powered down by a remote server. The remote server may be operated by any suitable transaction participant. The remote server may transmit, over a network, instructions that powers down the POS terminal. The POS terminal may be powered down for a pre-determined period of time.

The pre-determined period of time may correspond to a number of detected surcharge violations. If a POS terminal or merchant location is associated with more surcharge violations, the POS terminal may be disabled for a longer period of time.

The remote server may be programmed to power-up a POS terminal or otherwise bring the POS terminal back online. The remote server may bring the POS terminal back online after a predetermined period of time.

A disable signal may include programming a remote server to ignore or reject transactions received from a target POS terminal or target merchant location associated with a surcharge violation. The remote server may only reject or ignore transactions processed by the target POS terminal that are associated with one or more payment instrument attributes, transaction attributes or surcharge attributes that were present in the transaction that triggered a surcharge violation. Illustrative payment instrument, transaction and surcharge attributes are shown above in Tables 4-6.

For example, disabling a target POS terminal may include programming the POS terminal such that it is unable to process payments associated with a specific issuer, affinity agreement, transaction processing network or any suitable transaction attribute. Illustrative payment instrument, transaction and surcharge attributes are shown above in Tables 4-6.

A payment instrument may include a chip. The chip may be programmable. The chip may be an "EMV" chip. "EMV" is a technology that derives its name from the companies (Europay, MasterCard, and Visa) that helped develop the technology. When a payment instrument and its associated chip are inserted into a card reader, the card reader may provide power to the chip. The chip may generate a new authorization code each time the payment instrument is used to conduct a transaction. A transaction initiated using the payment instrument may not be processed with the authorization code. Thus, the chip may provide added security because simply copying information printed on a face of the payment instrument or encoded in the instrument's magnetic stripe may be insufficient to initiate a fraudulent transaction.

A chip may be programmed with executable instructions. The chip may be programmed such that in response to detection of a surcharge violation, when the chip is inserted into a card reader associated with a target POS terminal, the executable instructions disable the target POS terminal.

For example, in response to detection of a threshold number of surcharge violations at a merchant location, an issuer may determine that it is appropriate to disable one or more target POS terminals at the merchant location. The issuer may operate a network of automated teller machines ("ATMs") or other service locations that include card readers. When a payment instrument provided by the issuer is used at the other service location, a card reader may program the chip on the payment instrument to disable one or more of the target POS terminals. After programming a chip, when the chip is inserted into card reader associated with a target POS terminal, executable instructions stored on the chip may disable the target POS terminal.

Apparatus may include a system for controlling operation of a target POS terminal. The target POS terminal may be positioned at a merchant location. The system may control operation of two or more target POS terminals. The system may include a payment instrument. The payment instrument may include a programmable chip. The chip may be embedded in the payment instrument.

The system may include a first card reader. The first card reader may be configured to provide power to the chip when the chip is inserted into the card reader. In some embodiments, a power source on the payment instrument may power the chip. The chip may communicate with the card reader. The card reader may program the chip with executable instructions. The card reader may program the chip with executable instruction that disable and/or re-enable a target POS terminal. For example, the chip may be programmed with executable instructions that power-off or power-on the target POS terminal.

The first card reader may be configured to program the chip in response to detection of a surcharge violation triggered by a target POS terminal. The first card reader may part of an ATM. The ATM may be positioned at a location remote from the merchant location. The ATM may program the chip on the payment instrument. The ATM may program the chip with executable instructions that execute when the chip is inserted into a second card reader.

A computer system associated with an issuer of the payment instrument may detect that the customer (e.g., a user of the payment instrument) has been charged a surcharge amount that violates one or more surcharging rules. In response to detection of the surcharge violation, the computer system may configure one or more card readers controlled by the issuer to program a chip on the payment instrument with executable instructions.

In some embodiments, the computer system may configure the card readers to program a payment instrument of a customer that is different from the customer subjected to the surcharge violation. For example, a computer system of an issuer may detect a threshold number of surcharge violations at a merchant location. In response to detecting the threshold number of violations, a computer system of the issuer may analyze transaction histories associated with one or more payment instruments provided by the issuer. The computer system may identify one or more payment instruments that are expected to be used at the merchant location within a pre-determined period of time.

The computer system may configure one or more card readers to program chips on payment instruments associated with the identified customers. The computer system may program card readers at brick-and-mortar locations, ATMs or card readers at other service location (e.g., gas stations) remote from the target merchant location.

The first card readers may load, onto a chip, computer executable instructions that control power and/or operation of a target POS terminal at the merchant location. For example, an ATM or other card reader may program a chip with instructions that are to be executed in response to the payment instrument being inserted into a second card reader at the target merchant location. The instructions stored on the chip may be configured to detect and identify the second card reader and/or target merchant location.

The second card reader may be linked to a target POS terminal. The second card reader may be configured to provide power to the chip. The second card reader may be configured to extract executable instructions stored on the chip. The second card reader may be configured to execute instructions stored on the chip. The instructions, when executed by the second card reader, may disable the target POS terminal.

The instructions may disable a target POS terminal by powering-off the target POS terminal within a pre-determined period of time from a time the chip was inserted into the second card reader. In some embodiments, the instructions may power-off a target POS terminal for a pre-determined period of time. Instructions stored on the chip, when executed, may power-off of a plurality of target POS terminals at a target merchant location.

In some embodiments, the instructions may trigger a powering-on of one or more disabled POS terminals. The target POS terminal may be powered-on after the pre-determined period of time expires. In some embodiments, the instructions may trigger the powering on of the target POS terminal after the pre-determined period of time.

A system for controlling operation of a target POS terminal is provided. The system may control operation of the target POS terminal by triggering a shutdown of the target POS terminal at a target location.

The system may include a payment instrument. The payment instrument may be associated with a customer. The user may use the payment instrument to pay for goods, services or conduct other transactions at one or more target locations. The payment instrument may include a programmable chip. The chip may be an "EMV" chip. Executable instructions may be loaded onto the payment instrument. For example, the instructions may be stored on a chip. The executable instructions may be run when the chip is inserted into a card reader at a target location.

The system may include a first card reader. The first card reader may be linked to a target POS terminal. The first card reader may be configured to receive the chip. For example, the first card reader may receive the chip when the user presents the payment instrument as a form of payment. The first card reader may be configured to extract one or more payment instrument attributes stored on the chip.

The system may include a second card reader. The second card reader may be configured to receive the chip. The second card reader may be embedded in or otherwise part of an ATM. The second card reader may be positioned at a location remote from a target location.

When the chip is inserted into the second card reader, the payment instrument may be associated with at least one surcharge violation imposed by the target POS terminal. A computer system of a transaction participant (e.g., issuer, transaction processing network, etc. . . . ) may identify the at least one surcharge violation and associate the violation with the payment instrument.

In response to detecting the at least one surcharge violation, the computer system may configure the second card reader to set a flag on the chip. The flag may indicate that payment instrument has been subject to a surcharge violation by a target POS terminal. The computer system may also configure the second card reader to load executable instructions onto the chip. The executable instructions may be loaded onto the chip when the chip is inserted into the second card reader.

When run, the executable instructions loaded onto the chip may trigger a shutdown the target POS terminal. The executable instructions may be run when the chip is received by the first card reader or any other card reader associated or linked to the target POS terminal.

For example, in response to receiving a chip loaded with executable instructions, the first card reader may detect that the flag has been set on the chip. Based the flag, the target POS terminal may be identified. The first card reader may then extract the executable instructions stored on the chip. The first card reader may run the instructions and trigger a shutdown the target POS terminal. In some embodiments, POS controller or other computer system may run the executable instructions. In some embodiments, the first card reader may delete the executable instructions stored on the chip. Executable instructions may be deleted after the first card reader extracts the instructions.

The executable instructions may be configured to disable two or more target POS terminals at the merchant location. The second card reader (at the remote location) may be configured to program a plurality of chips (associated with a plurality of payment instruments) with executable instructions. Each chip may be programmed with executable instructions that are configured to shut down or otherwise disable one or more target POS terminals.

In some embodiments, before programming the chip, a computer system may estimate when a chip is expected to be inserted into the first card reader linked to a target POS terminal.

When the estimate indicates that the chip is expected to be inserted into the first card reader within a pre-determined period of time, the executable instructions may be loaded onto the chip.

The estimate may be determined based on a transaction history associated with a payment instrument. For example, a transaction history may indicate how often a payment instrument is used at a target merchant location.

A computer system that determines the estimate may include the second card reader. The second card reader may be in electronic communication with the computer system. The second card reader may be one of a plurality of second card readers. Each member of the plurality of second card readers may be capable of loading executable instructions onto one or more chips.

Each member of the plurality of second card readers may load executable instructions onto payment instruments until the computer system detects that at least one instance of the executable instruction have been read by the first card reader at the target location. In some embodiments, the plurality of second card readers may continue to load executable instructions onto payment instruments until the computer system detects that a target POS terminal has been disabled.

Methods for controlling operation of a POS terminal at a merchant location are provided. Methods may include detecting a threshold number of surcharge violations triggered at a merchant location. The surcharge violations may be imposed by one or more POS terminals at the merchant location.

A "target" location may be any suitable location. For example, a merchant location associated with the threshold number of surcharge violations may be a target merchant location. A "target" POS terminal may be any suitable POS terminal. For example, a POS terminal that imposed a surcharge violation may be a "target" POS terminal.

Methods may include identifying a set of payment instruments. Each member of the set may be expected to be used at the target merchant location within a pre-determined period of time. Each payment instrument in the set may include a programmable chip. Methods may include detecting that a chip has been inserted into a card reader remote from the target merchant location.

Methods may include programming the chip inserted into the card reader with executable instructions that disable a target POS terminal at the target merchant location. In some embodiments, methods may include programming the chip with executable instructions that disable a target POS terminal at any suitable location.

Methods may include disabling the target POS terminal when the chip is inserted into a card reader linked to the target POS terminal. The card reader may receive the chip. The card reader may extract executable instructions stored on the chip. The card reader may run the disabling instructions stored on the chip. The card reader may trigger a running of the disabling instructions on any suitable local or remote computer system.

Disabling a target POS terminal may include preventing the target POS terminal from communicating with a computer system of a transaction participant. For example, the instructions may prevent the target POS terminal from communicating with an issuer system or a transaction processing network. Disabling a target POS terminal may include powering down the target POS terminal.

Disabling may include preventing a target POS terminal from processing transactions associated with one or more attributes of the payment instrument. For example, the disabling instructions may prevent the target POS terminal from processing transactions initiated by a payment instrument associated with a specific affinity agreement or expiration date.

Before disabling a target POS terminal, methods may include transmitting a warning message to the target POS terminal. In some embodiments, the warning message may be transmitted to a POS controller. The warning message may provide a time or period of time when the disabling will occur.

In response receiving the warning the message, the target POS terminal (or associated POS controller) may transmit a compliance message to an issuer (or other transaction participant) system confirming that it has been configured to comply with one or more surcharge rules. In response to receiving the compliance message, methods may include aborting execution of the disabling instructions.

Methods may include monitoring a number of surcharge violations. The number of surcharge violations may be associated with a TP. For example, the number of surcharge violations may be associated with a merchant. The number of surcharge violations may be associated with a network of merchant locations. The number of surcharge violations may be associated with a checkout lane in a merchant location. The number of surcharge violations may be associated with a credit card transactions submitted via an e-commerce website.

The method may include determining a surcharge violation score. The surcharge violation score may be determined based on the number of surcharge violations. The surcharge violation score may be determined based on a ratio. The ratio may correspond to a ratio of the number of surcharge violations and a total number of transactions. The ratio may represent a number of surcharge violations per transaction. The surcharge violation score may represent a likelihood that a transaction will include a surcharge violation.

The method may include adjusting a transaction cost. The transaction cost may be adjusted based on the number of surcharge violations. The transaction cost may correspond to a merchant discount. For example, if a merchant generates a large number of surcharge violations over a period of time, a transaction processing network may raise the transaction cost charged to the merchant to process the merchant's transactions.

Apparatus may include an article of manufacture comprising a non-transitory computer usable medium having computer readable program code embodied therein. The program code when executed by a processor may cause a computer to register a surcharge violation. The surcharge violation may be registered with a central authority. A registered surcharge violation may be published. A registered surcharge violation may be posted on a website.

The program code may cause the computer to receive a surcharge violation notice. The SCR may include the surcharge violation notice. The violation notice may be transmitted from a mobile device. The surcharge violation notice may be transmitted by a customer that has been surcharged. The surcharge violation notice may include one or more surcharge attributes. The surcharge violation notice may indicate why a surcharge is in violation. A surcharge violation indication may be selectable for review by the surcharged customer.

The surcharge violation notice may include a receipt. The surcharge violation notice may include an image. The image may include a sign displaying one or more surcharge attributes. The image may include a transaction receipt. The second location may correspond to a street address. The street address may be extracted from the receipt.

The program code may cause the computer to determine a distance. The distance may correspond to distance between a first location and a second location. The first location may be determined by a mobile device. The second location may be a point of reference associated with a merchant location. The second location may be derived from the surcharge violation notice.

The first location may correspond to a global positioning system ("GPS") coordinate. The first location may be determined by the mobile device at a time an image is captured by the mobile device. The first location may correspond to a location stamp associated with the image. The first location may be determined by the mobile device simultaneous to payment instrument information transmission. The payment instrument information may be transmitted from a mobile device to a point-of-sale terminal of the merchant.

For example, the first location may be a longitude/latitude coordinate. The coordinate may be determined at a time a customer obtains one or more surcharge attributes. The customer may obtain a surcharge attribute by photographing a displayed surcharge. The surcharge may be displayed on a transaction receipt. The surcharge may be displayed on a sign proximate to a merchant location. The surcharge may be displayed on a website.

The program code may cause the computer to register the surcharge violation. The surcharge violation may be registered when the distance between the first location and the second location is less than a threshold value. When the distance is less than the threshold value, the surcharge violation notice may be associated with a merchant location.

For example, the threshold value may correspond to a radius extending from the second location. The radius may extend from a merchant location. When the first location determined by the mobile device is within the radius, the first location may be in or near the merchant location. Being in or near the merchant location may provide corroboration that the surcharge violation notice is likely associated with the merchant location.

The computer readable program code may cause the computer to receive a surcharge violation notice. The surcharge violation notice may be transmitted from a mobile device. The computer readable program code may cause the computer to generate a surcharge record. The surcharge record may be generated based on the surcharge violation notice. The computer readable program code may cause the computer to identify a surcharge violation. The surcharge violation may be identified based on the surcharge record.

The computer readable program code may cause the computer to identify the surcharge violation based on comparing one or more attributes of the surcharge record to one or more surcharge reference values.

The surcharge violation notice may include an image. The computer readable program code may cause the computer to identify a plurality of segments in the image. The computer readable program code may cause the computer to determine one or more surcharge attributes based on information extracted from the one or more of the plurality of segments. The computer readable program code may cause the computer to identify the surcharge violation by comparing the one or more attributes of the surcharge record to one or more surcharge reference values. The computer readable program code may cause the computer to register the surcharge violation when the one or more attributes of the surcharge record do not correspond to one or more of the surcharge reference values.

The computer readable program code may cause the computer to compare a location associated with the surcharge violation notice to a merchant location. The merchant location may be submitted by the merchant. The merchant may submit a list of locations at which surcharging may occur. The list may be submitted to the central authority.

The computer readable program code may cause the computer to identify a surcharge rule. The surcharge rule may be in effect during a time associated with the surcharge violation notice. The time may be a time stamp associated with the surcharge violation notice. The time stamp may be determined by the mobile device. The time stamp may be determined at a time that the surcharge attribute is obtained. The time stamp may be determined at a time an image of the surcharge is captured by the mobile device.

One exemplary surcharge rule may include imposing a surcharge based on a payment instrument attribute. For example, the surcharge rule may only forbid imposing a surcharge on a rewards card associated with a particular transaction processing network.

Another surcharge rule may forbid imposing a surcharge on a payment instrument based on the issuer associated with the payment instrument. Another surcharge rule may forbid imposing a surcharge on a debit card or a prepaid card. Another surcharge rule may forbid imposing a surcharge in a geographic location. The geographic location may correspond to a zip code, state borders, an area code or any suitable geographic region.

The computer readable program code may cause the computer to register the surcharge violation when the location is within a predetermined distance of the merchant location and the one or more of the surcharge attributes do not conform to the surcharge rule.

The surcharge violation may correspond to an improper surcharge amount. A surcharge amount may be improper if it results in a breach of an agreement with one or more TPs. The surcharge violation may correspond to an incentive offered at a point-of-sale. The incentive may include a discount on the purchase price if payment is made using an alternative payment method. The incentive may include offering a variable surcharge that is dependent on the issuer associated a payment instrument. The surcharge violation may be a surcharge that violates a law.

The surcharge violation may correspond to placement of a sign. Disclosure requirements associated with a surcharge may require that a merchant inform patrons of a surcharge before the patrons enter a merchant location. Disclosure requirements may require that a merchant inform patrons of a surcharge at a point-of-sale.

A customer may photograph an entrance to a merchant location. The photograph may show that there is no surcharge signage present at the entrance. A photograph of a point-of-sale may show that the surcharge displayed at the point-of-sale differs from a surcharge charged to the customer.

The surcharge violation may correspond to a double surcharge. For example a surcharge rule may state that a single surcharge may be imposed on a transaction. The TP may impose two surcharges on a transaction.

The computer readable program code may cause the computer to transmit the surcharge violation to an online registry. The registry may form a repository of surcharge violations. The registry may include surcharge violations associated with a plurality of TPs. The registry may be searchable. A user may search the registry for surcharge violations associated with a TP, such as a merchant or issuer. A user may search the registry for surcharge violations based on a transaction attribute such as a payment instrument, a location or a time. A user may search the registry for surcharge violations based on any suitable criteria.

Surcharge Auditing

Apparatus and methods for performing an audit of a transaction record are provided. Apparatus may include an article of manufacture comprising a non-transitory computer usable medium having computer readable program code embodied therein. The program code when executed by a processor may cause a computer to audit the transaction record.

The computer readable program code may cause the computer to receive the transaction record. The transaction record may be transmitted from a TP. The transaction record may be transmitted from a merchant. The transaction record may be transmitted from an acquirer. The transaction record may be transmitted from a mobile device.

The computer readable program code may cause the computer to determine a surcharge attribute. The surcharge attribute may be determined based on the one or more transaction attributes. The transaction record may include the one or more transaction attributes. The transaction record may include the surcharge attribute.

The computer readable program code may cause the computer to compare the surcharge attribute to a surcharge reference value. The computer readable program code may cause the computer to detect a surcharge violation. The surcharge violation may be detected when the surcharge attribute does not correspond to the surcharge reference value.

The computer readable program code may cause the computer to identify a payment instrument identifier. The payment instrument identifier may be included in the transaction record. The payment instrument identifier may correspond to a particular payment instrument. The payment instrument identifier may correspond to a payment instrument brand or product. A merchant identifier may be identified in the transaction record. The merchant identifier may correspond to a merchant. The merchant identifier may correspond to merchant location. The merchant identifier may correspond to a MCC. A purchase amount may be identified in the transaction record. The purchase amount may correspond to a sub-total. The sub-total may not include a surcharge amount. A surcharge amount may be identified in the transaction record.

The computer readable program code may cause the computer to determine a first surcharge-cap associated with the payment instrument identifier. The first surcharge-cap may correspond to a transaction cost associated with the payment instrument identifier. The computer readable program code may cause the computer to determine a second surcharge-cap associated with the merchant identifier. The second surcharge-cap may correspond to a transaction cost associated with the merchant. The second surcharge-cap may correspond to a transaction cost associated with a transaction processing network. For example, the second surcharge-cap may correspond to a product of 1.8 and the sum of: (1) an average interchange rate (e.g., 1.2%, 2%, (2%+10¢), etc. . . . ), charged by the transaction processing network and (2) average network fees (e.g., 5¢, $1, $1.25, etc. . . . ) charged by the transaction processing network.

The computer readable program code may cause the computer to determine a maximum surcharge. The maximum surcharge may equal the lesser of the first surcharge-cap and the second surcharge-cap. The computer readable program code may cause the computer to determine a maximum surcharge amount based on the maximum surcharge and the purchase amount. For example, the maximum surcharge amount may include a sum of a fixed fee and the purchase amount. The computer readable program code may cause the computer to detect the surcharge violation when the surcharge amount is greater than the maximum surcharge amount.

The computer readable program code may cause the computer to determine whether a plurality of stored transaction records include the surcharge violation. The plurality of stored transaction records may be previously executed transactions. The plurality of stored transactions may be pending transactions.

The computer readable program code may cause the computer to determine a correlation between two more stored transaction records. The correlation may be determined using any suitable technique. For example, the one or more transaction attributes may be linearly, or non-linearly, regressed upon the surcharge violation, modeled on the surcharge violation, predicted from the surcharge violation or estimated from the surcharge violation. The correlation may be performed utilizing a multivariate statistical model or a neural network. The correlation may include determining a correlation coefficient that indicates a degree of correlation between a transaction attribute and the surcharge violation.

Each stored transaction record may include the surcharge violation. The computer readable program code may cause the computer to determine a surcharge violation pattern based on the correlation. The computer may identify a pattern among the plurality of stored transaction records. The pattern may suggest a trend. The pattern may represent a statistical relationship. The pattern may be used to derive a performance metric.

For example, based on a correlation the computer may determine that within a geographic region, the surcharge violation is correlated with a purchase of a particular item purchased at a specific time of day. Each stored transaction record that "fits" into the pattern may be more likely to include a surcharge violation than other transaction records.

As a further example, based on a correlation the computer may determine that, when a payment processing device is used to calculate a surcharge, the surcharge is likely to be calculated incorrectly. The manufacturer and users of the device may be timely informed of the surcharge calculation error associated with the payment processing device.

The surcharge registry may be updated based on the detecting of a surcharge violation. The surcharge registry may maintain a list of each surcharge violation detected. The surcharge registry may maintain an association linking the surcharge violation to one or more transaction attributes. For example, the registry may link a surcharge violation to a merchant location where the transaction occurred. The registry may link a surcharge violation to a payment instrument or to a customer.

The surcharge registry may include the correlation and/or patterns derived from the correlation. The registry may display a graphical representation of the correlation and/or patterns. The registry may display the graphical representation in response to a query.

The computer readable program code may cause the computer to determine a surcharge violation pattern. The surcharge violation pattern may be determined based on a plurality of surcharge violations included in the surcharge registry. The surcharge registry may include a plurality of surcharge violations. Each surcharge violation may be associated with a different transaction attribute. The pattern may correspond to a transaction attribute that is likely to be associated with a surcharge violation. The pattern may correspond to a surcharge violation that is likely to be associated with a transaction attribute.

The computer readable program code may cause the computer to determine a refund amount. The refund amount may be associated with a transaction record. The refund amount may be associated with a transaction record that includes a surcharge violation. For example, a surcharge violation may involve a merchant charging a customer a surcharge amount that exceeds a maximum. The refund amount may correspond to a difference between the maximum allowable surcharge amount and the surcharge amount charged by the merchant.

The surcharge violation may correspond to a surcharge amount that is in breach of an agreement with one or more TPs. The surcharge violation may correspond to a double surcharge. The double surcharge may occur when a merchant imposes two surcharges on a single transaction.

As a further example, a double surcharge may result from a failure of the merchant to correctly calculate a surcharge refund due when an item is returned to the merchant. A customer may purchase two or more items in a transaction. The customer may pay a surcharge based on a total purchase amount. At a later time, the customer may return one of the items purchased. A surcharge rule may require that the merchant return a pro-rata portion of the surcharge in addition to the price of the returned item. A failure of the merchant to return the pro-rata portion of the surcharge may result in a double surcharge violation.

If the purchase is processed as a single transaction the merchant may only charge one surcharge. The refund amount may correspond to the surcharge imposed on the extra transaction. The extra transaction may be the transaction that occurs first in time. The extra transaction may be the transaction that occurs second in time. The extra transaction may be the transaction associated with a greater surcharge than the other transaction. The extra transaction may be the transaction associated with a lesser surcharge than the other transaction.

The computer readable program code may cause the computer to transmit a surcharge violation notice. The surcharge violation notice may be transmitted to a point-of-sale terminal. The surcharge violation may be transmitted to a point-of-sale terminal in response to a detection of the surcharge violation. The surcharge violation notice may inform a customer at the point-of-sale that a surcharge violation has been detected. The customer may be offered an option to abort the transaction.

The computer readable program code may cause the computer to waive the surcharge in response to the detection of the surcharge violation. For example, a merchant may program a surcharge calculation device to waive a surcharge if a surcharge violation is detected when calculating the surcharge.

The computer readable program code may cause the computer to transmit a transaction denial notice. The denial notice may inform a TP that a surcharge amount will not be charged to a customer account associated with the payment instrument. The denial notice may be transmitted in response to detection of the surcharge violation. When a surcharge violation is detected the issuer may authorize the purchase amount exclusive of the surcharge amount. The surcharge amount may be denied. When a surcharge violation is detected the issuer may deny the entire transaction. The surcharge violation notice may include the denial notice.

In response to detection of a surcharge violation, a TP may restrict an ability of the merchant who imposed the wrongful surcharge to process transactions. The restriction may be imposed for a time period. A certification process may be required to remove the restriction. The certification process may include the merchant submitting to a transaction audit. The transaction audit may be performed prior to transmitting a transaction record for authorization. The transaction audit may be performed prior to authorizing the transaction.

The computer readable program code may cause the computer to associate the transaction record with the surcharge violation. The transaction record may be associated with the surcharge violation when the surcharge attribute corresponds to a geographic location and the geographic location is within a jurisdiction that forbids imposing a surcharge on a credit card transaction. When the surcharge attribute corresponds to a jurisdiction that forbids imposing a surcharge, the surcharge amount may be denied. When the surcharge attribute corresponds to a jurisdiction that forbids imposing a surcharge, the purchase amount may be denied.

Apparatus may include an article of manufacture comprising a non-transitory computer usable medium having computer readable program code embodied therein. The program code when executed by a processor may cause a computer to perform a surcharge violation audit.

The computer readable program code may cause the computer to identify a first plurality of transaction records. The first plurality of transaction records may include one or more records associated with a first surcharge violation. Each record in the plurality of records may be associated with the first surcharge violation.

The computer readable program code may cause the computer to identify a second plurality of transaction. One or more records in the second plurality may be associated with a second surcharge violation. Each record in the second plurality may be associated with the second surcharge violation. The second plurality of transaction records may be a subset of the first plurality of transaction records. One or more records in the second plurality may be associated with the first and the second surcharge violations.

When the first surcharge violation is detected in a plurality of records, it may be likely that the plurality of transaction records also include a second surcharge violation. A correlation may be determined that associates the first surcharge violation with the second surcharge violation. When the first surcharge violation is detected in a plurality of transaction records, the correlation may show that it is likely that the plurality also includes the second surcharge violation.

The computer readable program code may cause the computer to generate a plurality of surcharge records. The surcharge records may be generated based on the first plurality of transaction records. Each surcharge record may include a first surcharge attribute. Each surcharge record may include a second surcharge attribute.

The computer readable program code may cause the computer to identify the first surcharge violation. The computer readable program code may cause the computer to identify the second surcharge violation. The first surcharge violation may be identified if the first surcharge attribute does not correspond to a first surcharge reference value. The second surcharge violation may be identified if the second surcharge attribute does not correspond to a second surcharge reference value.

The first and/or second surcharge violation may correspond to a surcharge that is in breach of an agreement with a TP. The first and/or second surcharge violation may correspond to a double surcharge. The first and/or second surcharge violation may correspond to a surcharge amount that is determined based on an unauthorized surcharge fraction. The surcharge fraction may be unauthorized with respect to the payment instrument, the merchant or with respect to any suitable transaction attribute. The surcharge fraction may be unauthorized because it is associated with a surcharge amount that exceeds a maximum.

Apparatus may include an article of manufacture comprising a non-transitory computer usable medium having computer readable program code embodied therein, the code when executed by a processor may cause a computer to perform a chargeback audit.

The computer readable program code may cause the computer to receive a chargeback record. The chargeback record may be generated when a customer requests a refund for a purchase amount previously charged to an account associated with a payment instrument. The chargeback record may be generated when a customer attempts to a return a purchased item to a merchant. The chargeback record may be generated when an acquirer attempts to obtain funds from an issuer and/or transaction processing network. The chargeback record may include one or more features of the transaction record.

The chargeback record may include a chargeback amount. The computer readable program code may cause the computer to determine the chargeback amount. The chargeback amount may correspond to a refund amount requested by a customer. The chargeback amount may correspond to a refund amount entitled to be credited to a customer account. The chargeback record may include one or more chargeback attributes. A chargeback attribute may correspond to a transaction attribute.

The computer readable program code may cause the computer to identify a surcharge associated with the chargeback record. The computer may identify the surcharge based on detecting one or more chargeback attributes. For example, a chargeback attribute may correspond to a barcode associated with a purchased product. The barcode may be scanned when the customer returns the product. Based on the barcode, a transaction record may be identified. The transaction record may correspond to a purchase of the product. The transaction record may include one or more surcharge attributes associated with the purchase.

The computer readable program code may cause the computer to calculate a surcharge refund. The surcharge refund may correspond to a surcharge amount. The computer readable program code may cause the computer to determine whether the chargeback amount includes the surcharge refund. When a product is returned to a merchant, the computer may determine whether the customer has received a refund of the surcharge amount charged at the time of purchase.

The computer readable program code may cause the computer to identify a transaction record corresponding to the chargeback record. The corresponding transaction record may include transaction attributes available at the time of the purchase. The computer readable program code may cause the computer to identify in the corresponding transaction record, a purchase amount, and a surcharge amount. The computer readable program code may cause the computer to associate the chargeback record with a surcharge violation when the chargeback amount does not correspond to a sum of (a) the purchase amount and (b) the surcharge amount.

The computer readable program code may cause the computer to identify a geographic value in the corresponding transaction record. The computer readable program code may cause the computer to determine if the geographic value corresponds to a jurisdiction that forbids imposing a surcharge on a credit card transaction. The computer readable program code may cause the computer to associate the corresponding transaction record with a surcharge violation when the geographic value corresponds to the jurisdiction, and the corresponding transaction record includes a surcharge amount. When the corresponding transaction record includes the surcharge amount, a surcharge had been imposed on the transaction at the time of purchase. Because the corresponding transaction record indicates that the transaction occurred in a jurisdiction that forbids surcharging, under the law of the jurisdiction the surcharge is unlawful.

When the corresponding transaction record is associated with a surcharge error, the computer may determine a surcharge refund amount. The surcharge refund amount may correspond to all or a portion of the surcharge amount associated with the corresponding transaction record. The surcharge refund amount may correspond to a difference between an allowable surcharge amount and an erroneously calculated surcharge amount. The surcharge violation may be any suitable surcharge violation.

The computer readable program code may cause the computer to identify, in the corresponding transaction record, a transaction attribute corresponding to time-of-sale. The computer readable program code may cause the computer to identify a surcharge in effect at the time-of-sale. The computer readable program code may cause the computer to determine the surcharge refund based on the surcharge and the purchase amount. The purchase amount may correspond to a purchase amount of a single item. The purchase amount may correspond to a purchase amount of a plurality of items.

For example, having determined a surcharge fraction in effect on a date associated with a past purchase, the refund amount may be determined based on product of the surcharge fraction in effect on the date and the purchase amount.

The computer readable program code may cause the computer to determine the chargeback amount based on the purchase amount and the surcharge refund. The chargeback amount may correspond to a sum of a purchase price paid for a product and the surcharge amount imposed at the time of purchase.

The computer readable program code may cause the computer to determine the chargeback amount based on one or more transaction attributes in a transaction record. The transaction record may correspond to a transaction record generated at a time of purchase. The transaction attributes may include a total purchase amount, a per-item purchase amount and a surcharge attribute.

For example, a customer may purchase a plurality of items. The customer may wish to return less than all of the plurality of items. The surcharge refund amount may be determined based on apportioning the surcharge amount in the transaction record. The apportioning may be based on a ratio of: (1) a total of the purchase amounts of each of the items the customer wishes to return, and (2) a total of the purchase amounts of all of the plurality of items purchased.

The steps of illustrative methods may be performed in an order other than the order shown and/or described herein. Some embodiments may omit steps shown and/or described in connection with the illustrative methods. Some embodiments may include steps that are neither shown nor described in connection with the illustrative methods. Illustrative method steps may be combined. For example, one illustrative method may include steps shown in connection with another illustrative method.

Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus and/or some or all of the steps of the illustrative methods.

Illustrative embodiments of apparatus and methods in accordance with the principles of the disclosure will now be described with reference to the accompanying drawings, which form a part hereof. It is to be understood that other embodiments may be utilized and structural, functional and procedural modifications may be made without departing from the scope and spirit of the present disclosure.

As will be appreciated by one of skill in the art, the disclosure described herein may be embodied in whole or in part as a method, a data processing system, or a computer program product. Accordingly, the disclosure may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
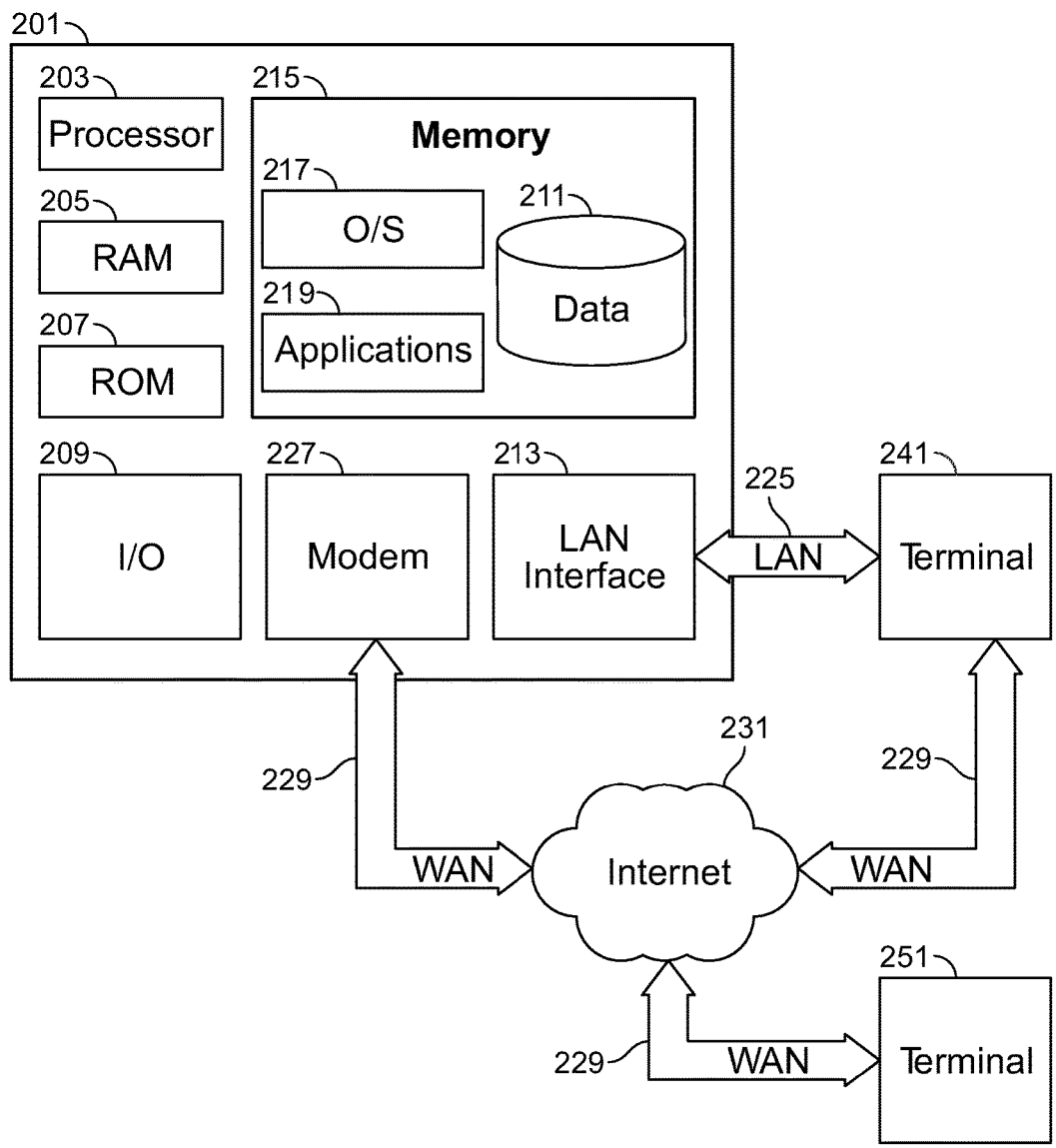
FIG. 2 shows illustrative apparatus in accordance with the principles of the disclosure.

FIG. 2 is a block diagram that illustrates a generic computing device 201 (alternatively referred to herein as a "server") that may be used according to an illustrative embodiment of the disclosure. The computer server 201 may have a processor 203 for controlling overall operation of the server and its associated components, including RAM 205, ROM 207, input/output module 209, and memory 215. Server 201 may include one or more receiver modules, server modules and processors that may be configured to receive transaction records, apply surcharge rules, identify surcharge violations, compare values, establish correlations and perform any other suitable tasks related to determining the transaction cost.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 215 and/or storage to provide instructions to processor 203 for enabling server 201 to perform various functions. For example, memory 215 may store software used by server 201, such as an operating system 217, application programs 219, and an associated database 211. Alternatively, some or all of server 201 computer executable instructions may be embodied in hardware or firmware (not shown). As described in detail below, database 211 may provide storage for customer information, transaction cost information, transaction records, transaction attributes, surcharge records, chargeback records, thresholds, merchant information, surcharge rules, payment instrument information and any other suitable information.

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service ("SMS"), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, smart phone, tablet, or any other suitable device for storing, transmitting and/or transporting relevant information.

Any information described above in connection with database 211, and any other suitable information, may be stored in memory 215.

One or more of applications 219 may include one or more algorithms that may be used to receive transaction records, identify surcharge violations, apply surcharge rules, determine refund amounts and perform any other suitable tasks related to determining a transaction cost.

The disclosure may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, mobile phones and/or other personal digital assistants ("PDAs"), multiprocessor systems, microprocessor-based systems, set top boxes, tablets, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The disclosure may be described in the general context of computer-executable instructions, such as program modules, being executed by a computer. Generally, program modules may include routines, programs, objects, components, data structures, etc., that perform particular tasks or store or process data structures, objects and other data types. The disclosure may also be practiced in distributed computing environments where tasks are performed by separate (local or remote) processing devices that are linked through a communications network. In a distributed computing environment, program modules may be located in both local and remote computer storage media including memory storage devices.

Figure 3:
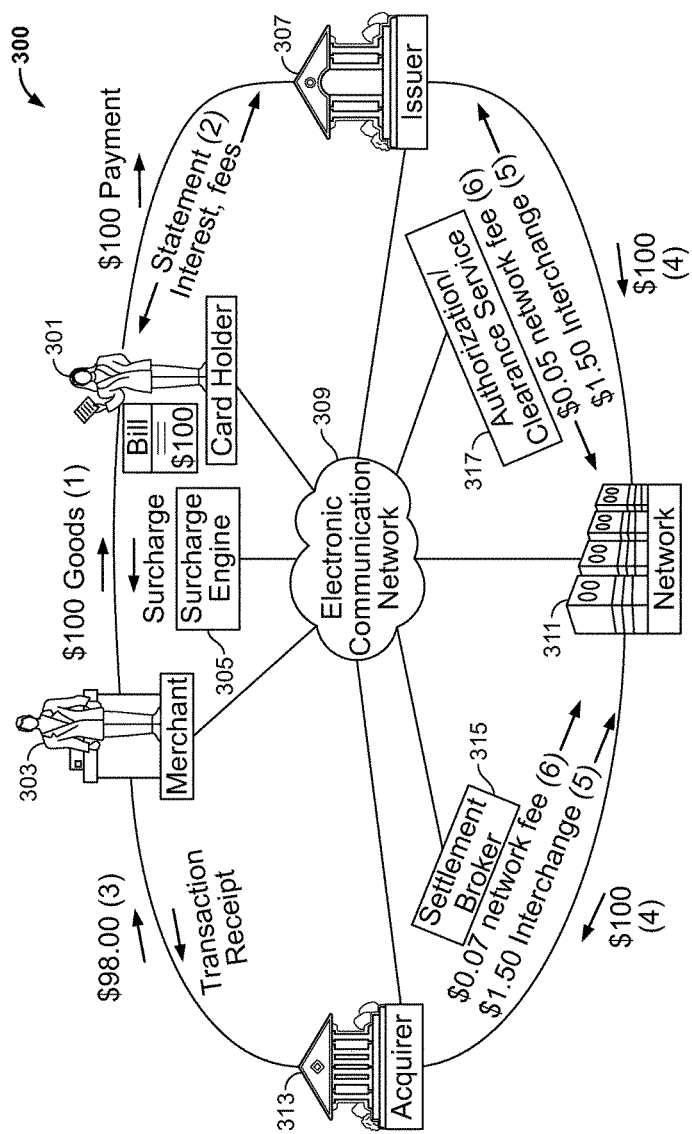
FIG. 3 shows an arrangement in which apparatus and methods in accordance with the principles of the disclosure may be used.

FIG. 3 shows illustrative credit card transaction settlement flow 300.

At step 1 card holder 301 may offer a payment instrument, such as a credit card, as payment for $100 of goods sold by merchant 303. Card holder 301 may present information associated with the credit card at the merchant's point-of-sale terminal (not shown). The information may be presented via the payment instrument, a loyalty card or any other suitable device or method.

Based on the information presented by card holder 301, surcharge engine 305 may determine an offset amount. The surcharge engine may determine one or more surcharge attributes. The offset amount may be based on the surcharge fraction.

The offset amount may be added to the $100 price charged by merchant 303. The $100 price may include the offset amount. A total amount may be determined. The total amount may include the price, offset amount, sales tax and any other suitable costs associated with the purchase of the goods.

The information presented by card holder 301, may be transmitted via electronic communication network 309 to transaction network 311. The information may include a transaction record.

Transaction network 311 may receive the information presented by card holder 301 via electronic network 309. Based on the received information, transaction network 311 may transmit an authorization, via electronic communication network 309, to merchant 303. Transaction network 311 may communicate with issuer 307. Transaction network 311 may verify that card holder 301 has not exceeded a credit limit associated with the payment instrument. The authorization may include an indication that the transaction network has approved a charge of the total amount to an account associated with the payment instrument. Authorization services may be provided by a third party such as a transaction broker.

Card holder 301 may acknowledge the total amount. The acknowledgement may include an agreement by card holder 301 to place the charge on the account associated with the payment instrument. The acknowledgement may include a commitment by the card holder to pay the total amount to issuer 307.

At step 2, issuer 307 may prepare a statement for card holder 301. The statement may include the total amount owed to issuer 307. The statement may include interest or other fees owed to issuer 307. Issuer 307 may bear an expense of collecting the total amount, interest and fees from card holder 301. A portion of the transaction cost may flow to issuer 307 to fund collection efforts of issuer 307 and offset a risk of default of card holder 301.

At step 3, merchant 303 may present the acknowledgment of card holder 301 and/or the associated authorization by transaction network 311 to acquirer 313. Acquirer 313 may transfer funds to merchant 303 prior to actual collection, by issuer 307, of the total amount from card holder 301. Acquirer 313 may offer funds to merchant 303 prior to settlement between acquirer 313 and issuer 307.

Acquirer 313 may deduct a merchant discount from an amount of funds transferred to merchant 303. The offset amount determined by surcharge engine 305 may offset, at least in part, the merchant discount paid by merchant 303. The offset amount may correspond to transaction costs charged by transaction network 311. The offset amount may include transaction costs charged by acquirer 313 and issuer 307.

In flow 300, the merchant discount is 2% of the $100 price. Without an offset, merchant 303 receives $98 of the $100 price.

At step 4, acquirer 313 settles the transaction with issuer 307. Acquirer 313 may utilize transaction network 311 to settle the transaction. Acquirer 313 may utilize broker 315 to settle the transaction. Broker 315 may offer settlement services at a lower transaction cost than transaction network 311. Broker 315 may offer the lower transaction costs as a result of aggregating transactions from different acquirers. Each of the aggregated transactions may require settlement between issuer 307 and acquirer 313.

Step 4 shows that at least a portion of the merchant discount flows through transaction network 311 from acquirer 313 to issuer 307. Step 4 also shows that transaction network 311 may receive a network fee from acquirer 313. Step 4 also shows that transaction network 311 receives a network fee from issuer 307. Acquirer 313 and issuer 307 may pay transaction network 311 network fees for facilitating settlement of the transaction.

Table 7 shows net positions of the parties to flow 300.

TABLE 7

Net positions.

| Party | Net ($) |
| --- | --- |
| Issuer | 1.45 |
| Acquirer | 0.43 |
| Network | 0.12 |

TABLE 7-continued

Net positions.

| Party | Net ($) |
|---|---|
| Merchant | 0 |
| Customer | −2.00 |

Table 8 shows benefits of flow 300 to the transaction participants.

TABLE 8

Illustrative benefits of each transaction participant.

| Party | Benefit |
|---|---|
| Merchant | Access to card holder funds and credit |
| | Timely settlement |
| | Protection from customer fraud and credit risk |
| | Increased purchase price amounts |
| | Payment guaranteed |
| Issuer | Reliable payment platform with broad acceptance |
| | Consistent customer experience across merchants |
| | Predictable source of revenue to support card issuance costs |
| Card holder | Access to ready funds and credit |
| | Ability to make purchases virtually anywhere |
| | Protection from fraud |
| | Protection from merchant disputes |
| | Reward for card based purchases |
| | Does not need to carry cash |
| Transaction Broker | Revenue from trading transaction processing bids |
| | Reliable routing platform |
| | Reducing transaction processing overhead |
| | Access to consumers and suppliers of transaction services |

Figure 4:
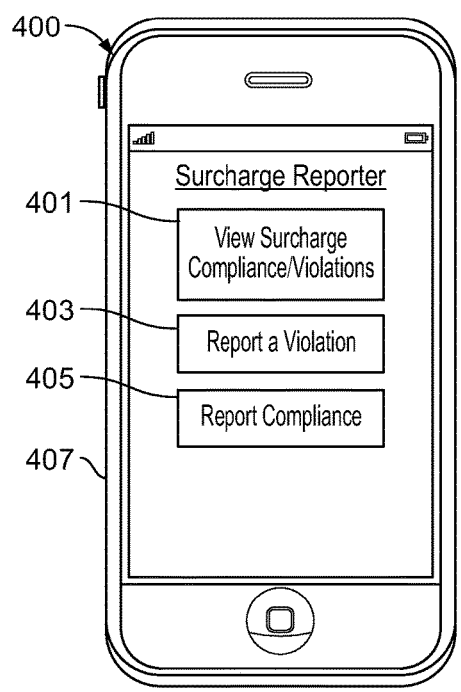
FIGS. 4-8 show illustrative apparatus in accordance with the principles of the disclosure.

FIG. 4 shows illustrative apparatus 400. Apparatus 400 includes mobile device 407 configured to process instructions from an exemplary mobile device application ("application"). The application may instruct device 407 to display options 401, 403 and 405. Options 401, 403 and 405 may be utilized by a user of the mobile phone.

Using option 401, the user may view surcharge compliance and violation information. Mobile device 407 may receive instructions from the application to access surcharge compliance and violation information stored in an online surcharge registry. Using option 403, the user may use mobile device 407 to report a surcharge violation. Option 405 allows the user to report surcharge compliance using mobile device 407.

Figure 5:
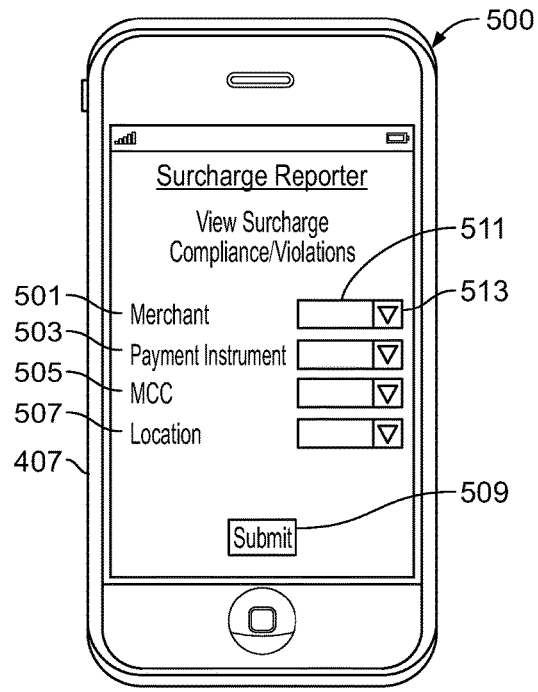

FIG. 5 shows illustrative apparatus 500. Apparatus 500 includes mobile device 407 following selection of option 401 (shown in FIG. 4). In response to the utilization of option 401, mobile device 407 displays options 501-509. Options 501-509 allow the user to view surcharge compliance/violation information. Options 501-509 allow the user to view surcharge compliance/violation information based on various criteria.

For example, option 501 allows the user to view surcharge compliance/violations associated with a merchant. The user may enter a merchant name or identifier into field 511. Drop-down arrow 513 allows the user to select a merchant from a plurality of pre-populated choices. The pre-populated choices may be determined based on a location of the mobile device. For example, the pre-populated choices may include merchant locations within a radius of the mobile device.

Option 503 allows the user to view surcharge compliance/violation information associated with a payment instrument. The user may enter payment instrument information. The payment instrument information may include a brand, product or any suitable payment instrument attribute. The user may choose from one of a plurality of pre-populated payment instrument choices. The pre-populated payment instrument choices may be determined based on the merchant identified in option 501. For example, the pre-populated choice may include payment instruments accepted by the merchant identified in option 501.

Option 505 allows the user to view surcharge compliance/violation information associated with a merchant category code ("MCC"). The user may enter the MCC. The user may select from one of a plurality of pre-populated MCC choices. The pre-populated MCC choices may be determined based on the merchant identified in option 501 and/or the payment instrument identified in option 503. For example, the pre-populated choice may include MCCs associated with the merchant identified in option 501.

Option 507 allows the user to view surcharge compliance/violation information associated with a merchant location. The user may enter the location. The user may choose from one of a plurality of pre-populated choices. The pre-populated choices may be determined based on the information entered using options 501, 503 and/or 505. For example, the pre-populated choice may include locations that accept the payment instrument selected in option 503. The pre-populated choices may include merchant locations that offer products categorized in the MCC selected in option 505 and where a payment instrument selected in option 503 is accepted.

The user may use option 509 to transmit the request to for surcharge compliance/violation information. The submitted request includes any user selection made using options 501-507.

Figure 6:
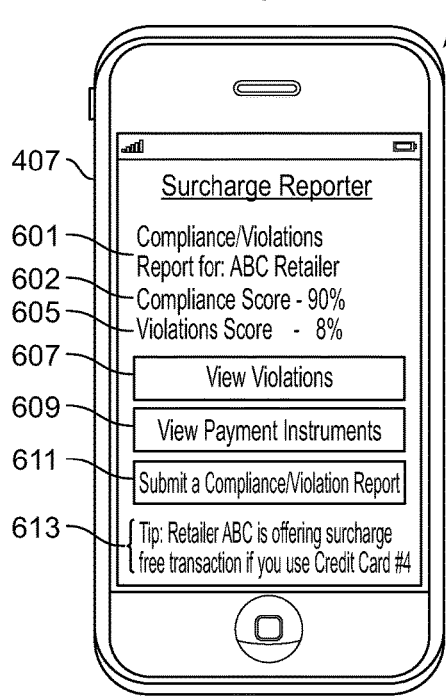

FIG. 6 shows illustrative apparatus 600. Apparatus 600 includes mobile device 407 following selection of option 509 (shown in FIG. 5). Apparatus 600 displays an illustrative surcharge compliance/violation report. The report may be generated based on criteria entered into options 501-507 (shown in FIG. 5).

The report identifies merchant 601. The report includes compliance score 602 and violation score 603. Using option 607 the user views detail regarding surcharge violations associated with merchant 601. The user may select option 609 to sort the compliance/violation information associated with merchant 601 based on payment instruments accepted by merchant 601. The user may use option 611 to submit a compliance/violation report associated with merchant 601.

Apparatus 600 may display tip 613. Tip 613 may display a surcharge promotion being offered by merchant 601.

Figure 7:
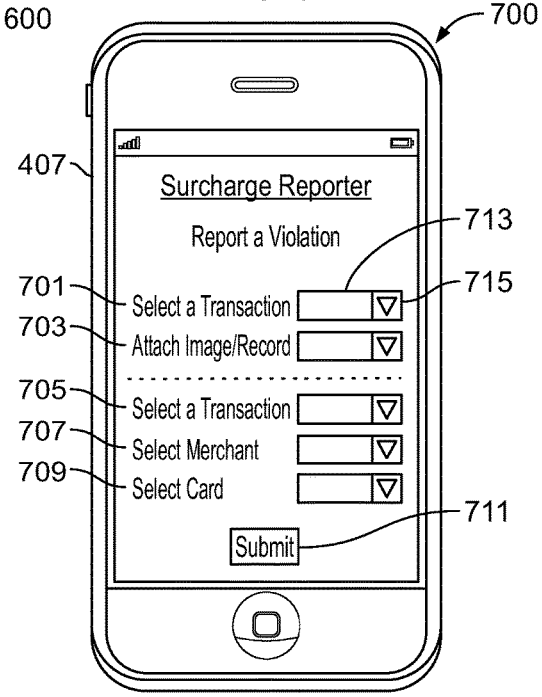

FIG. 7 shows illustrative apparatus 700. Apparatus 700 includes mobile device 407 following utilization of option 611 (shown in FIG. 6). In response to the utilization of option 611, mobile device 407 displays an illustrative digital form for reporting a surcharge violation. The digital form includes options 701-711.

Option 701 allows the user to input a transaction. The selected transaction may include a surcharge violation. The use may enter a transaction identifier into text box 713.

Using drop-down arrow 715, the user may choose a transaction from a list of transactions. The list of transactions may include transactions that have been initiated using the mobile device. The list of transactions may include transactions associated with merchant 601 (shown in FIG. 6). In some embodiments, using drop-down arrow 713 may present a list of transaction attributes. The user may select the transaction based on a time, a location or any suitable transaction attribute.

Using option 703 the user may attach an image or record to the violation submission. Using option 705 the user may input a violation type. For example, the user may specify that the violation observed corresponds to an unlawful surcharge. Using option 707 the user may input a merchant associated with the surcharge violation. The user may also input a payment instrument associated with the violation using option 709. The user may submit the digital form using option 711. Based on the information input into the digital form via options 701-709, a system (not shown) may attempt to identify and/or confirm a surcharge violation.

Figure 8:
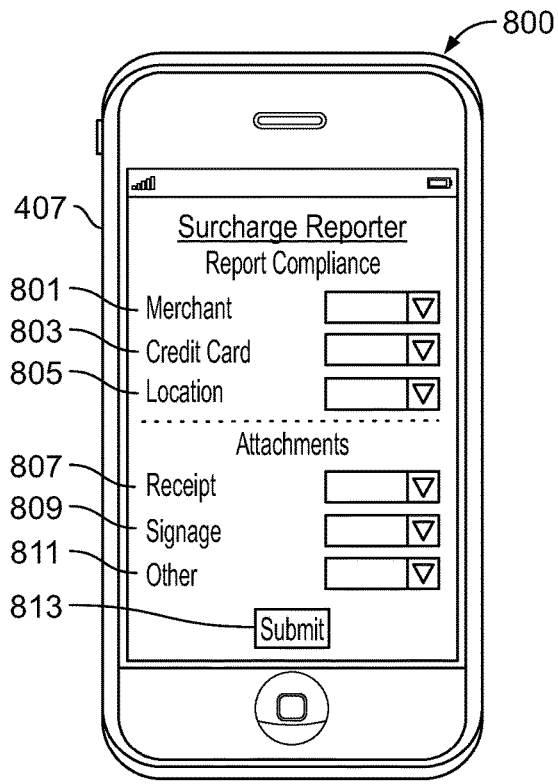

FIG. 8 shows illustrative apparatus 800. Apparatus 800 includes mobile device 407 following utilization of option 405 (shown in FIG. 4). In response to the utilization of option 405, mobile device 407 displays an illustrative digital form for reporting surcharge compliance. The digital form includes options 801-805.

The user may input a merchant using option 801. The user may input a payment instrument using option 803. The user may input a location using option 805.

The user may attach corroborating information using options 807-811. The corroborating information may support the user's assertion that the merchant has imposed a compliant surcharge. The user may attach a digital receipt using option 807. The digital receipt may be an image of a receipt. The digital receipt may be a receipt received in response to purchasing a product using mobile device 407 to present payment instrument information. The user may submit the digital form using option 813.

Figure 9:
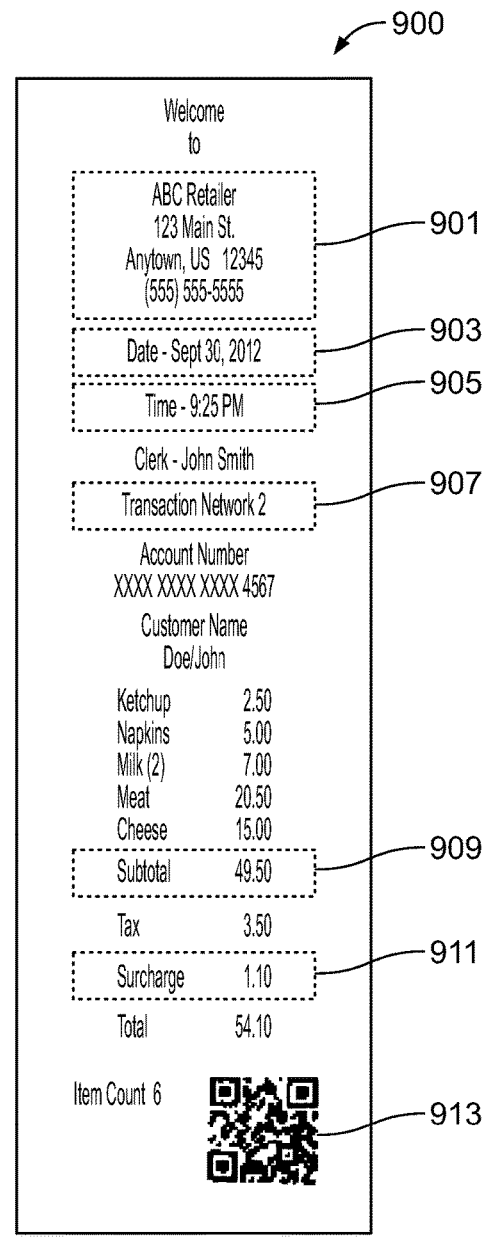
FIG. 9 shows illustrative information in accordance with the principles of the disclosure.

FIG. 9 shows illustrative receipt image 900. Image 900 includes illustrative segments 901-913. Each of segments 901-913 may correspond to a transaction attribute. Information from segments 901-913 may be extracted from image 900. The information extracted from image 900 may be used to identify a surcharge violation. The information extracted from image 900 may be used to confirm a reported surcharge violation.

Segment 913 shows an illustrative surcharge certification. Segment 913 may show that image 900 has been certified as being "compliant." Segment 913 may show that surcharge amount 911 has been certified as being compliant with one or more surcharge rules.

Segment 913 may show that image 900 has been certified as being "in violation." Segment 913 may show that surcharge amount 911 has been certified as being in violation of one or more surcharge rules.

Figure 10:
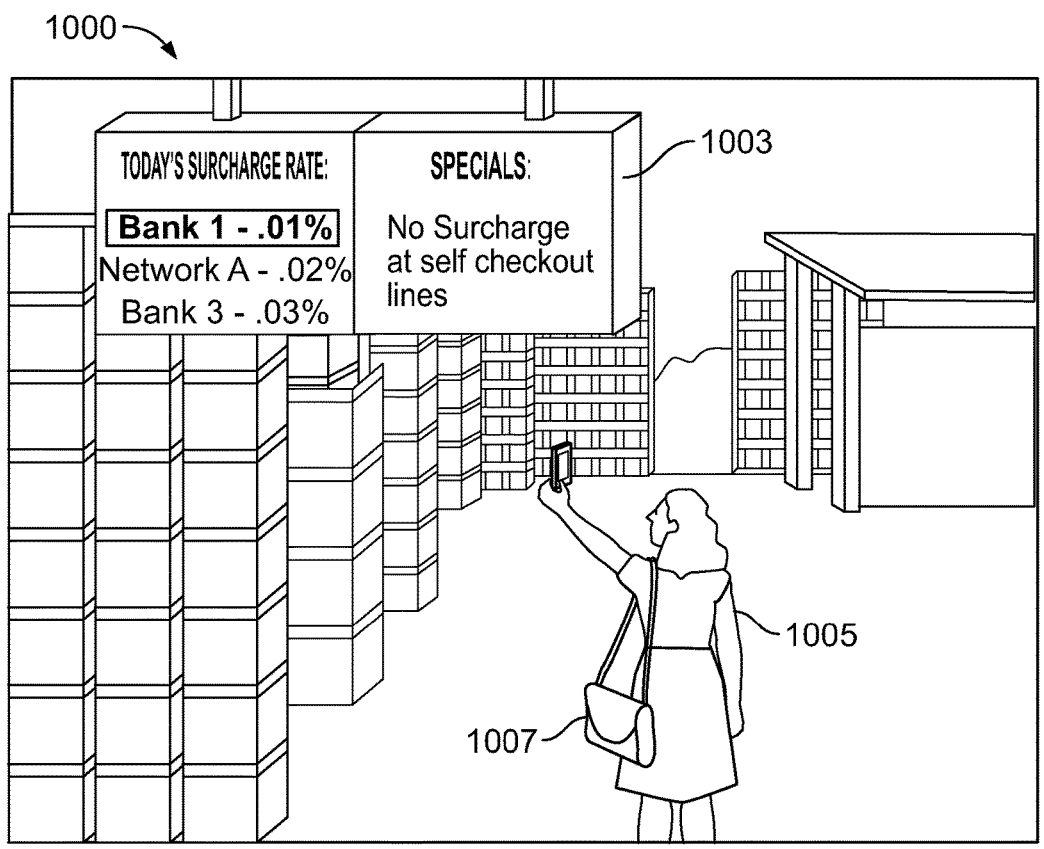
FIG. 10 shows an illustrative scenario in accordance with the principles of the disclosure.

FIG. 10 shows illustrative scenario 1000. Scenario 1000 may include display 1003. Display 1003 may be positioned at a point-of-entry to a merchant location. Display 1003 may present surcharge information to customer 1005. Display 1003 may show special surcharges or ranked surcharges being offered by a merchant. Display 1003 shows the surcharges ranked from lowest to highest. Display 1003 shows that the merchant is offering "surcharge free" purchases if the customer utilizes a self-checkout line. Display 1003 shows that a surcharge may be based on the issuer associated with a payment instrument. Display 1003 shows that the surcharge may be based on the transaction network associated with a payment instrument.

Customer 1005 may possess one or more payment instrument in purse 1007. Upon viewing the surcharge information present by display 1003, customer may decide whether or not to make a purchase at the merchant location. Upon viewing the surcharge information presented by display 1003, customer may decide which payment instrument to use to make a purchase at the merchant location.

Customer 1005 may make a purchase at the merchant location using a credit card associated with Bank 1. Customer 1005 may be charged a surcharge amount that is based on a surcharge fraction of 0.02%. The surcharge amount may be printed on a receipt, such as receipt 900 (shown in FIG. 9) issued to customer 1005. Customer 1005 may submit a surcharge violation report using a digital form shown in FIG. 7. Customer 1005 may obtain an image of sign 1003 using a mobile device. Customer 1005 may attach the image of sign 1003 to the surcharge violation report using option 703 (shown in FIG. 7). The attached image of sign 1003 may corroborate the claim that the surcharge fraction associated with credit cards issued by Bank 1 should have been 0.01%.

The mobile device may associate the image of sign 1003 with a time and/or location stamp. The time and/or location stamp may corroborate that the image was obtained at a time and location associated the merchant location where customer 1005 claims a surcharge violation occurred. The image of sign 1003 may demonstrate that the merchant has violated a disclosure requirement associated with imposing a surcharge.

Figures 11, 12:
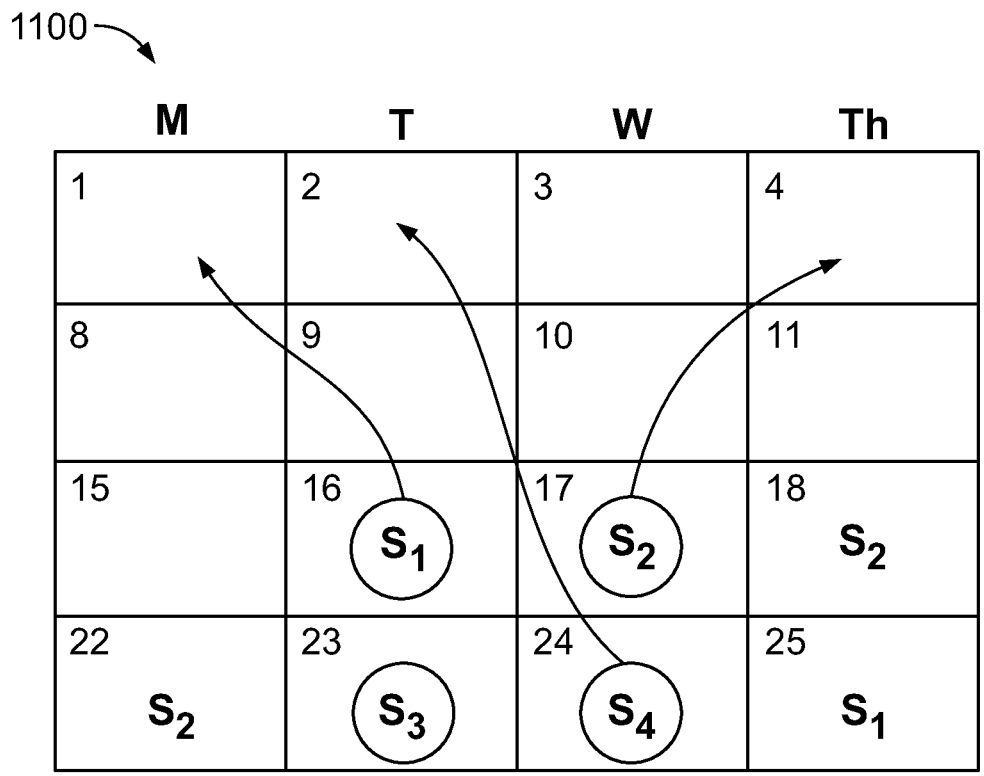

FIG. 11 shows illustrative surcharge schedule 1100. Schedule 1100 shows surcharges S1-S4. Each surcharge is associated with a weekday.

Schedule 1100 shows that surcharge S1 is scheduled to be imposed on Tuesday the $16^{th}$. Schedule 1100 also shows that surcharge S1 is associated with a notice time of Monday the $1^{st}$. On Monday the $1^{st}$, one or more surcharge attributes associated with surcharge S1 may be presented on one or more displays. The notice time associated with S1 corresponds to nine weekdays.

Schedule 1100 shows that surcharge S2 is scheduled to be imposed on Wednesday the $17^{th}$ and is associated with a notice time of Thursday the $4^{th}$. On Thursday the $4^{th}$, one or more surcharge attributes associated with surcharge S2 may be presented on one or more displays. The notice time associated with S2 corresponds to seven weekdays.

Schedule 1100 shows that surcharge S3 is scheduled to be imposed on Tuesday the $23^{rd}$ and is not associated with a notice time earlier than the day the surcharge is imposed. On Tuesday the $23^{rd}$, one or more surcharge attributes associated with surcharge S3 may be presented on one or more displays. S3 may correspond to a reduction of surcharges S1 and/or S2.

Schedule 1100 shows that surcharge S4 is scheduled to be imposed on Wednesday the $24^{th}$ and is associated with a notice time of Tuesday the $2^{nd}$. On Tuesday the $2^{nd}$, one or more surcharge attributes associated with surcharge S4 may be presented on one or more displays. The notice time associated with S4 corresponds to thirteen weekdays.

FIG. 12 shows illustrative surcharge notice 1200. Surcharge notice 1200 may present surcharge information. The surcharge information may include payment instrument brands 1203, surcharge 1205 and surcharge exceptions 1207.

Surcharge notice 1200 includes four exemplary brands 1203. A payment instrument may be associated with one or more of the four brands 1203. A brand may correspond to an issuer of the payment instrument. A brand may correspond to a transaction network affiliated with the payment instrument. Each brand is associated with a surcharge 1205.

For example, Bank 2 is associated with a first surcharge and a second surcharge. The first surcharge includes a surcharge fraction of 1/100. The first surcharge is imposed on all purchases. The second surcharge includes the surcharge fraction and a fixed amount of 50¢. The second surcharge is imposed on purchases valued less than $10.

Surcharge notice 1200 indicates that each brand 1203 may be associated with a surcharge exception 1207. The surcharge exception 1207 may indicate that, under certain conditions, a payment instrument may be exempt from the surcharge. For example, surcharge notice 1200 shows that payment instruments issued by Bank 2 are exempt from the surcharge if the payment instrument is associated with Transaction Network T. Transaction Network T may be the transaction network that processes transactions associated with payment instruments issued by Bank 2.

FIG. 13 shows illustrative transaction record 1300. Transaction record 1300 may be generated based on transaction information received and/or available at a time of purchase. The transaction record may include point-of-sale ("POS") attributes 1301. POS attributes 1301 may include transaction information, customer information and merchant information. Exemplary POS attributes 1301 may include a date, a time, a check-out lane indicator or any suitable transaction attribute available at a point-of-sale.

Transaction record 1300 may include surcharge attributes 1303. Exemplary surcharge attributes 1303 may include a surcharge amount, maximum surcharge amount, surcharge fraction, transaction cost or other suitable surcharge information.

Transaction record 1300 may include synoptic attributes 1305. Synoptic attributes 1305 may include attributes derived based on other transaction attributes. Synoptic attributes 1305 may include attributes derived based on other transaction attributes. The synoptic attributes may be determined based on a pattern detected in a plurality of transaction records. Exemplary synoptic attributes may include a merchant transaction statistic, a market statistic and an issuer statistic. The synoptic attributes 1305 may be concatenated to transaction record 1300. Synoptic attributes 1305 may be concatenated to transaction record 1300 after execution of the transaction.

FIG. 14 shows illustrative POS attributes 1401 and illustrative synoptic attributes 1403. POS attributes 1401 may include location 1404. Location 1404 may be associated with a POS terminal. Location 1404 may be associated with an address. POS attributes 1401 may include time 1413 and date 1408. POS attributes 1401 may include amount 1410 and number of items 1412. Amount 1410 may correspond to a price of the product. Number of items 1412 may correspond to a number of items purchased by a customer in a transaction.

POS attributes 1401 may include state/province 1414. State/province 1414 may be associated with regulations governing imposition of a surcharge.

POS attributes 1401 may include checkout number 1418. A merchant may impose a different surcharge at different check-out lines. The merchant may offer no or a reduced surcharge if a self-checkout line is utilized. The self-check-out line may be associated with a checkout number 1418.

POS attributes 1401 may include credit card type 1420. Credit card type 1420 may correspond to the payment instrument presented by a customer to pay for a purchase. A surcharge schedule or surcharge amount may be associated with credit card type 1420.

POS attributes 1401 may include merchant category code ("MCC") 1422. MCC 1422 may group merchants that supply similar products. Some merchants in MCC 1422 may impose a surcharge, while others may not. Merchants within MCC 1422 may surcharge at different rates or amounts.

FIG. 14 includes synoptic attributes 1403. Synoptic attributes 1403 may include transaction volume 1421, total sales 1423 and fiscal period 1425. Fiscal period 1425 may be determined based on a time associated with transaction record 1300. Transaction volume 1421 and total sales 1423 may be associated with fiscal period 1425.

For example, transaction records may be sorted by date 1408 and location 1404. A first number of transaction records may include the month of September and an address on Main Street. The first number may be appended to each transaction record that includes the date in September and the address on Main Street. The first number may correspond to transaction volume 1421. The first number may be a synoptic attribute. A second number of transaction records may include a date in the month of August and the address on Main Street. The second number may be a synoptic attribute.

The first number may be compared to the second number. A result of the comparing may be a synoptic attribute. The first number may be concatenated to transaction records that include the date in September. The second number may be concatenated to transaction records that include the date in August. A result of the comparing may be concatenated to transaction records that include either the date in August or the date in September.

Synoptic attributes 1403 may include credit card payment ratio 1427. Credit card payment ratio 1427 may include a comparison of a number of purchases made using a credit card to a number of purchases made using alternative payment methods. The ratio may be computed for a particular merchant, MCC, time/date, location credit card type or other suitable transaction attribute.

Synoptic attributes 1403 may include transaction frequency 1429, total transactions per credit card type 1433 and average transaction cost 1435. Average transaction cost 1435 may be calculated for a plurality of transaction records.

For example, each transaction record that includes a particular POS attribute, such as a purchase made at location X, may include a variable transaction cost Y. Transaction cost Y may vary based on transaction attributes present in a transaction record. The transaction cost Y may correspond to a surcharge attribute (shown above in Table 4). Average transaction cost 1435 may correspond to an average transaction cost associated with location X. Average transaction cost 1435 may be appended to each transaction record that includes the attribute corresponding to location X.

Synoptic attributes 1403 may include credit risk 1437. An issuer may associate each authorized transaction with a credit risk. The issuer may append the credit risk to the transaction record. The credit risk may be determined based on a credit history associated with credit card type 1420. The credit risk may be determined based on a credit history associated with the purchasing customer.

FIG. 15 shows illustrative surcharge record 1500. Surcharge record 1500 may include surcharge attributes 1503-1521. Each of attributes 1503-1521 may correspond to a value. Each of attributes 1503-1521 may be identified in a transaction record such as transaction record 1300 (shown in FIG. 13).

A surcharge violation may be determined based on comparing one or more of attributes 1503-1521 to surcharge reference values 1501. Surcharge reference values 1501 may include values that correspond to surcharge attributes 1523-1537. Surcharge reference values 1501 may be determined based on one or more surcharge rules.

For example, max allowable surcharge fraction 1529 may be compared to surcharge fraction 1511. If surcharge fraction 1511 exceeds max allowable surcharge fraction 1529, surcharge record 1500 may be associated with a surcharge violation.

Figure 16:
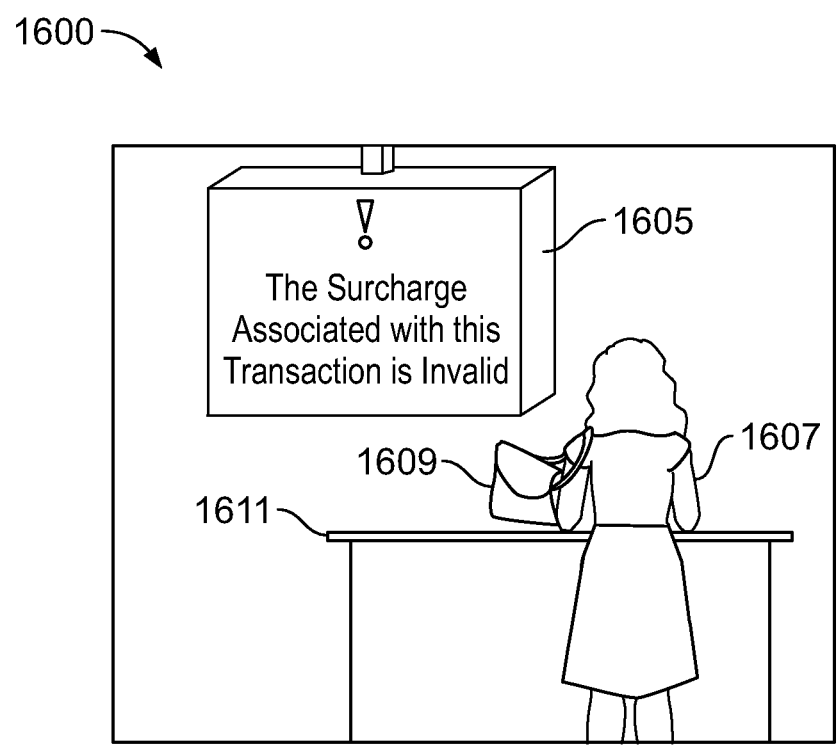
FIG. 16 shows an illustrative scenario in accordance with the principles of the disclosure.

FIG. 16 shows illustrative scenario 1600. Scenario 1600 shows customer 1607 at a point-of-sale. At the point-of-sale, customer 1607 may place purse 1609 on counter 1611. Counter 1611 may include a transceiver (not shown). The transceiver may communicate with one or more payment instruments inside purse 1609. The transceiver may receive payment instrument information from the one or more payment instruments.

Based on the payment instrument information, display 1605 may present surcharge information to customer 1607. FIG. 16 shows that display 1605 is informing customer 1607 that a surcharge violation has been detected. In response to the surcharge violation, customer 1607 may abort the transaction. In response to the surcharge violation a merchant may waive the surcharge associated with the received payment instrument information.

FIG. 17 shows illustrative chargeback record 1700. Chargeback record 1700 may include a plurality of chargeback attributes. Chargeback record 1700 may be associated with transaction record 1701. Chargeback record 1700 may be associated with transaction record 1701. Chargeback record 1700 may be associated with transaction record 1701 based on one or more attribute shared by records 1700 and 1701. For example, chargeback record 1700 may be associated with transaction record 1701 based on transaction ID 1703.

Based on transaction attributes included in transaction record 1701, a surcharge refund amount may be determined. The surcharge refund may be determined for one of a plurality of items 1707 included in transaction record 1701. For example, a customer may wish to return a product corresponding to item ID 1705. The product corresponding to item ID 1705 may be one of the plurality of items 1707.

Surcharge refund amount 1709 may be determined for item ID 1705. Surcharge refund amount 1709 may be determined based on total surcharge amount 1711 and items purchased 1707. Surcharge refund amount 1709 may be determined based on any suitable transaction attributes.

Figure 18:
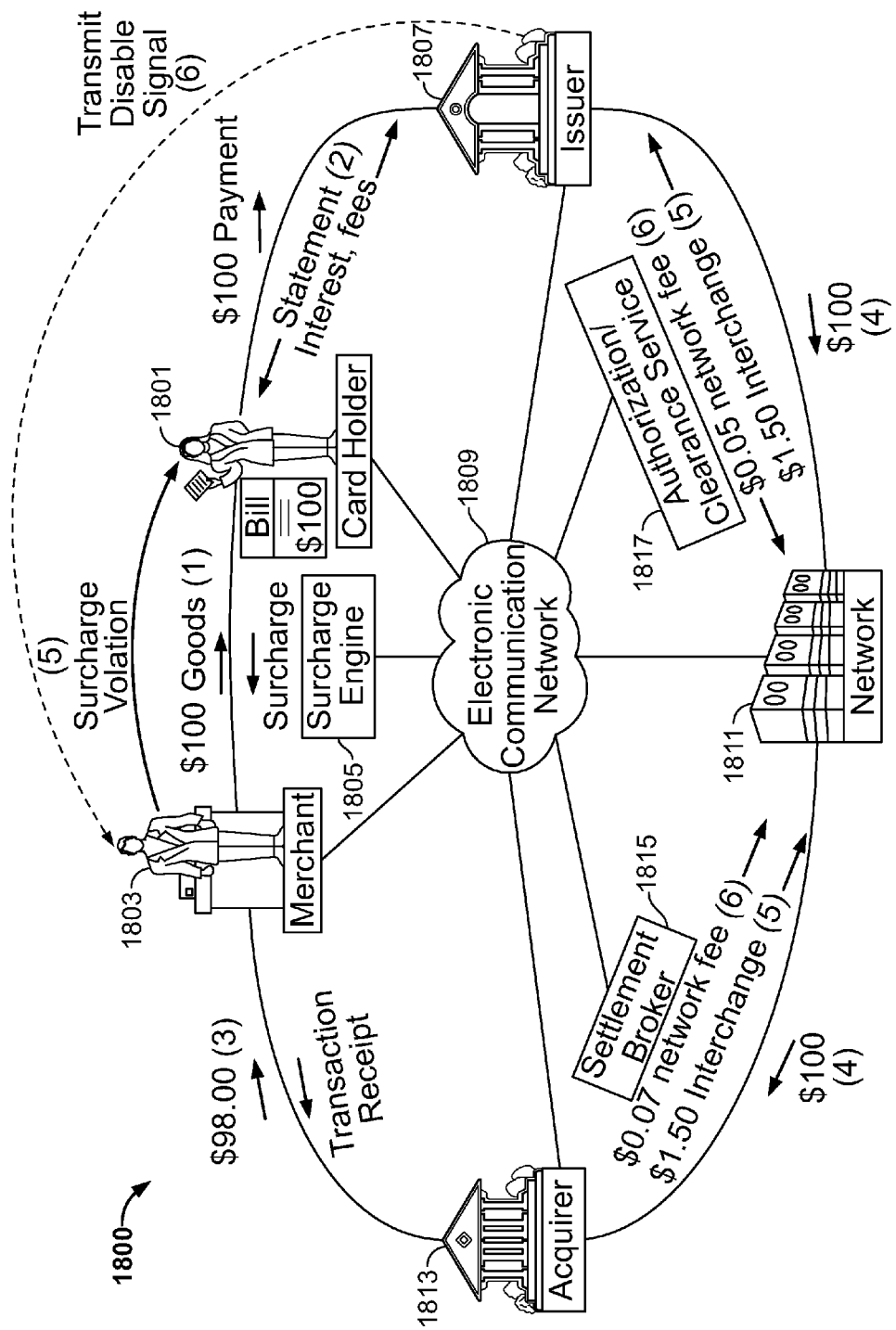
FIG. 18 shows an arrangement in which apparatus and methods in accordance with the principles of the disclosure may be used.

FIG. 18 shows illustrative credit card transaction flow 1800. Transaction flow 1800 may include one or more transaction steps in common with transaction flow 300 (shown above in FIG. 3). Merchant 1803 may capture customer information using a POS terminal.

Transaction flow 1800 shows that at step 5, a surcharge violation is detected. The surcharge violation may be that merchant 1803 charged customer 1801 an excessive surcharge amount. The surcharge violation may be detected may any suitable apparatus shown in FIG. 18. For example, the surcharge violation may be detected by surcharge engine 1805.

In response to the surcharge violation, at step 6, issuer 1807 transmits a disable signal to merchant 1803. FIG. 18 shows issuer 1807 transmitting the disable signal directly to merchant 1803. In some embodiments, a disable signal may be transmitted by surcharge engine 1805. A disable signal may be transmitted by loading executable instructions onto a payment instrument used by customer 1801. The disable signal may affect operation of one or more POS terminals of merchant 1803. For example, the disable signal may affect a target POS terminal at merchant 1803. In some embodiments, the disable signal may affect operation of any suitable component of a merchant POS system, such as a POS controller.

Figure 19:
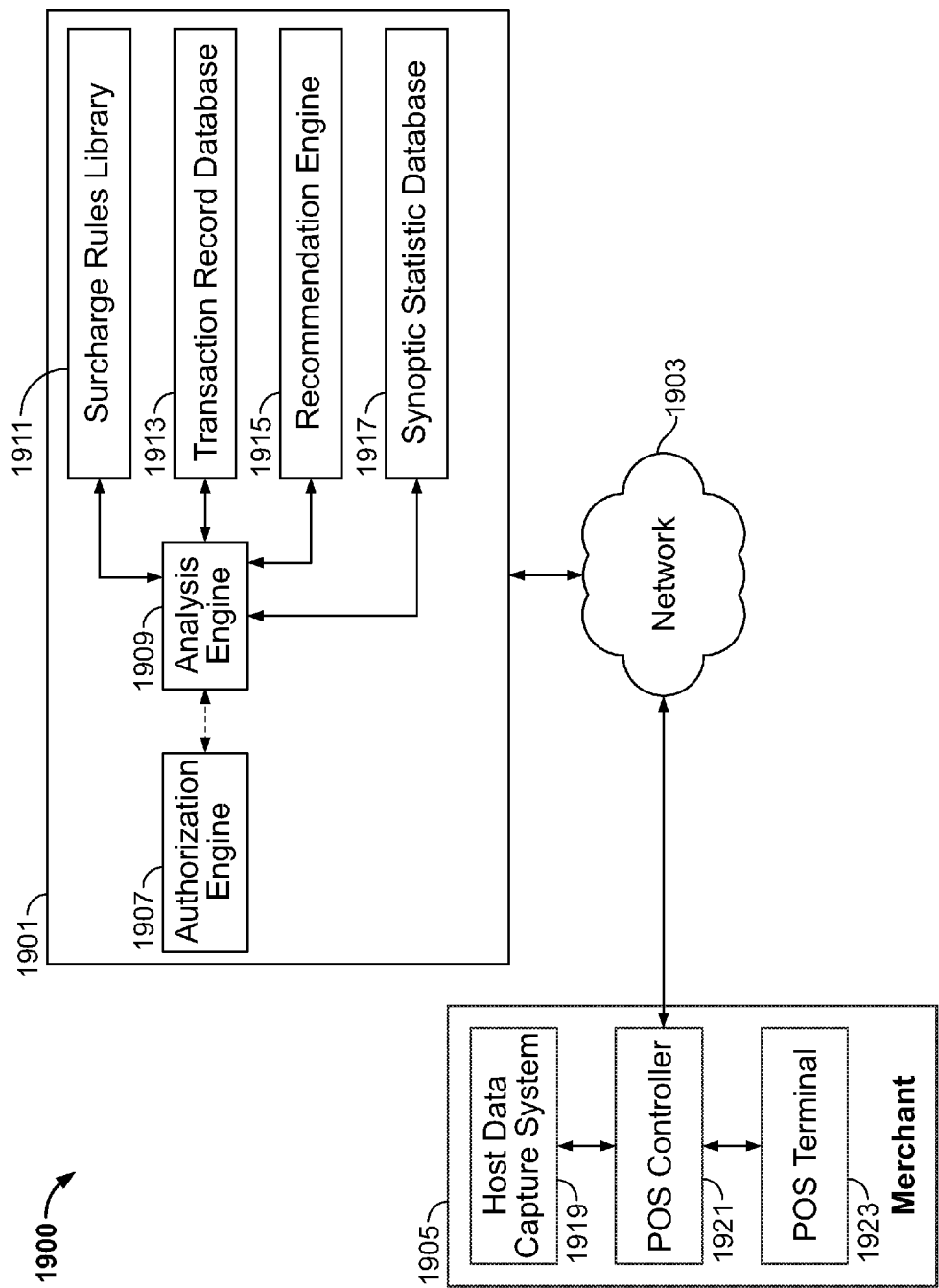
FIG. 19 shows illustrative apparatus in accordance with the principles of the disclosure.

FIG. 19 shows illustrative components and connections of surcharge engine 1901. Surcharge engine 1901 may include one or more features of surcharge engine 305 (shown in FIG. 3) or surcharge engine 1805 (shown in FIG. 18). In some embodiments, surcharge engine 1901 may include authorization engine 1907. In some embodiments, surcharge engine 1901 may include connections to other transaction participant systems. Surcharge engine 1901 may communicate with one or more transaction participant system using network 1903.

FIG. 19 shows that surcharge engine 1901 may include a connection to merchant POS system 1905. A customer may purchase goods by transferring customer information from a payment instrument, such as a credit card, to POS terminal 1923. POS terminal 1923 may read the customer information stored on the payment instrument. For example, POS terminal 1923 may include or be linked to a card reader. The payment instrument may store data in a magnetic strip, a bar code, a chip or any other suitable data storage device or format. The customer information may include issuer information, account information and any other suitable information (see Tables 4-6, shown above).

POS terminal 1923 may transmit transaction information to POS controller 1921. The transaction information may include some or all of the customer information and any other suitable information, such as the transaction amount, information regarding the purchased goods and/or one or more values corresponding to one or more transaction attributes.

POS controller 1921 may act as a server for providing user prompts and display layout information to one or more POS terminals such as POS terminal 1923. POS controller 1921 may receive transaction information from one or more of the POS terminals.

POS controller 1921 may transmit the transaction information to host data capture system 1919. Host data capture system 1919 may store transaction information received from POS controller 1921. Host data capture system 1919 may also store accounting data, inventory data and other suitable data that may be used to determine an appropriate surcharge. Some embodiments may not include host data capture system 1919.

The transaction information may include merchant information. The merchant information may include information about the merchant, the merchant's business, the merchant's network membership, the merchant's sale metrics any other suitable information. The transaction information may be stored in any suitable element of merchant POS system 1905, network component 1903 and surcharge engine 1901.

POS controller 1921 may be configured to determine and/or apply a surcharge amount. In some embodiments, host data capture system 1919 may be configured to determine and/or apply the surcharge amount. In some embodiments, POS controller 1921 may determine and/or apply a surcharge amount. The imposed surcharge amount may be displayed at POS terminal 1923.

Surcharge engine 1901 may verify the surcharge amount imposed by merchant POS system 1905. Surcharge engine 1901 may determine whether merchant POS system 1905 has triggered a surcharge violation.

POS terminal 1923 may have one or more interactive features that the customer may use. The features may provide the customer with information that may help the customer decide whether to execute a transaction. The customer may use the features to obtain more information about the merchant, the transaction, the transaction cost, transaction costs associated with different payment instruments (e.g., credit cards, debit cards, instruments or devices that include a contact chip, such as an ISO14443-compliant contactless chip, or other electronic purchasing devices), surcharge or other suitable information.

Host data capture system 1919 may route the transaction record onto network 1903. The routing may be governed by the transaction information. For example, the routing may be governed by a bank issuer number ("BIN") that is encoded in the customer's credit card.

Network 1903 may include a credit card network "processor," which is known to those of ordinary skill in the art. The illustrative systems shown in FIG. 19 may include one or more other processors that perform tasks that are appropriate for the components thereof.

Surcharge engine 1901 may monitor traffic on network 1903. Surcharge engine 1901 may intercept surcharged transactions routed by merchant POS system 1905 onto network 1903. Network 1903 may include a network operated by an acquirer such acquirer 313 (shown in FIG. 3). Network 1903 may include a network operated by transaction processing network 311 (shown in FIG. 3). Network 1903 may include a network operated by issuer 307 (shown in FIG. 3).

Surcharge engine 1901 may include authorization engine 1907. Authorization engine 1907 may render a transaction authorization decision based on a transaction record or transaction information received from merchant POS system 1905. Authorization engine 1907 may authorize a surcharge amount independently of any other charges associated with a transaction (e.g., a purchase amount). In some embodiments, surcharge engine 1901 may transmit a transaction record to an issuer system for authorization of non-surcharge related amounts.

Surcharge engine 1901 includes analysis engine 1909. Analysis engine 1909 may analyze surcharge attributes of a transaction record. Analysis engine 1909 may output a surcharge recommendation. The surcharge recommendation may recommend an adjustment to a surcharge amount.

Analysis engine 1909 may receive input from surcharge rules library 1911. Surcharge rules library 1911 may determine whether a surcharge attribute in a transaction record conforms to a surcharge rule or regulations governing imposition of a surcharge amount.

Analysis engine 1909 may receive input recommendation engine 1915. Recommendation engine 1915 may determine a surcharge recommendation. The surcharge recommendation may be determined based on information stored in transaction record database 1913. An illustrative surcharge recommendation may suggest waiving a surcharge or adjusting a surcharge amount.

Transaction record database 1913 may store historical transaction records. The received transaction behavior information may be correlated to information stored in transaction record database 1913. The surcharge recommendation may be determined based on the correlating.

Recommendation engine 1915 may determine the surcharge recommendation based on synoptic statistics 1917. Synoptic statistics 1917 may include sensitivity of customer purchasing behavior to a surcharge amount within a particular market or geographic region. Synoptic statistics 1917 may include issuer synoptic statistics. Exemplary issuer synoptic statistics may include an effect of the surcharge amount on revenue of an issuer or other transaction participant.

Surcharge engine 1901 may transmit authorizations of purchase and surcharge amounts to merchant POS system 1905 through network 1903. The surcharge authorization information may include the authorization decision (e.g., "GRANTED" or "DENIED").

In some embodiments, if surcharge engine 1901 detects a surcharge violation, surcharge engine 1901 may disable one more components of merchant POS system 1905. For example, one or more components of merchant POS system 1905 may be disabled and unable to access other transaction participant systems. Disabling may include preventing one more components of merchant system 1905 from accessing acquirer 313, transaction processing network 311 and/or issuer 307 (all shown in FIG. 3). Disabling may include preventing one more components of merchant system 1905 from accessing other transaction participant system by "blacklisting" merchant POS system 1905 on network 1903.

In some embodiments, a disable signal may be specific to a target system. The target may be any suitable component of a transaction participant system, such as merchant POS system 1905 (shown in FIG. 19). The disable signal may prevent operation of the target system. The disable signal may power-off the target system or prevent the target system from communicating with other transaction participant systems over network 1809 (shown in FIG. 18).

Figure 20:
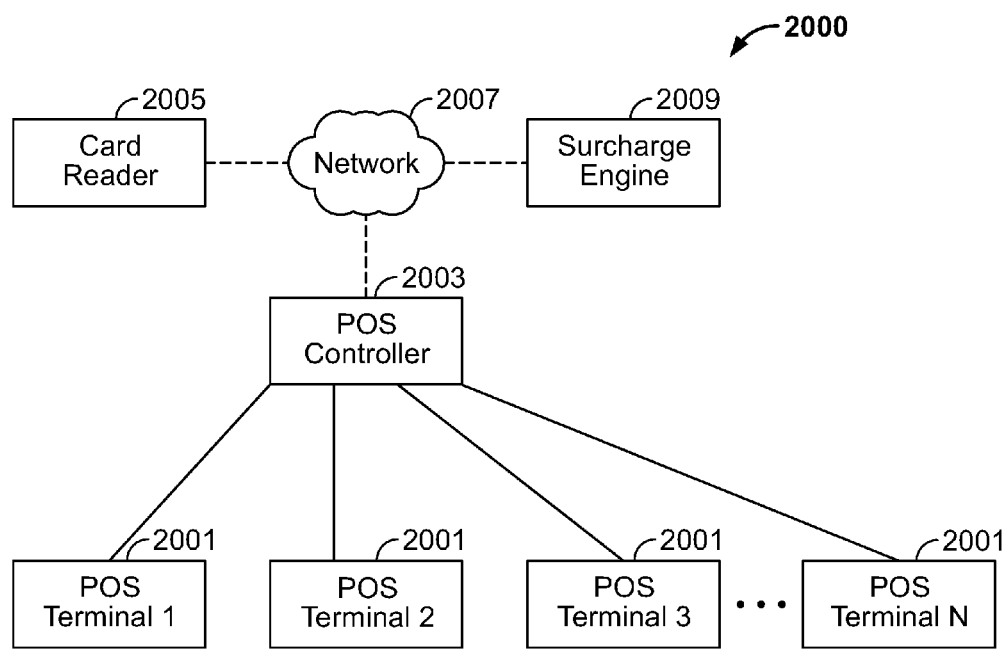
FIG. 20 shows illustrative apparatus in accordance with the principles of the disclosure.

FIG. 20 shows illustrative system 2000. System 2000 includes POS controller 2003. POS controller 2003 may receive transaction information from one or more of POS terminals 2001. POS terminals 2001 may include one or more features of POS terminal 1923 (shown in FIG. 19).

A customer may purchase goods by transferring information from a payment instrument, such as a credit card, to one or more of POS terminals 2001. The information may be transferred by inserting a chip on the payment instrument into a card reader linked to one or more of POS terminals 2001. Information transferred may include issuer information, account information and any other suitable information.

POS controller 2003 may act as a computer server for providing user prompts and display layout information to one or more of POS terminals 2001. POS controller 2001 may receive transaction information from one or more of the POS terminals 2001. For example, POS controller 2005 may receive item scan information from POS terminals 2001.

The transaction information received from POS terminals 2001 may include any suitable transaction attribute. Illustrative transaction attributes are shown above in Table 5. Transaction information may include a transaction record. POS controller 2003 may receive a transaction record from POS terminals 2001. POS controller 2003 may transmit the transaction record to network 2007.

Network 2007 may route transaction information to surcharge engine 2009. Surcharge engine may include one or more features of surcharge engine 305 (shown in FIG. 3), surcharge engine 1805 (shown in FIG. 18) and surcharge engine 1901 (shown in FIG. 19).

Surcharge engine 2009 may determine whether one or more of POS terminals 2001 have triggered a surcharge violation. In response to detecting a surcharge violation, surcharge engine 2009 may transmit a disable signal to one or more of POS terminals 2001.

For example, in some embodiments, surcharge engine 2009 may transmit a disable signal to POS terminals 2001 via network 2007 and POS controller 2003. In some embodiments, surcharge engine 2009 may configure card reader 2005 to load executable instructions onto a chip on a payment instrument inserted into card reader 2005. Card reader 2005 may be positioned at a location remote from POS controller 2003 or POS terminals 2001. For example, card reader 2005 may be part of an ATM or teller station operated by issuer 307 (shown in FIG. 3).

Surcharge engine 2009 may identify card reader 2005 based on a likelihood that card reader 2005 will receive a payment instrument that may subsequently be used at POS terminals 2001. Surcharge engine 2009 may configure card reader 2005 (or associated apparatus, such as an ATM) to load instructions onto a chip on the payment instrument inserted into card reader 2005.

The executable instructions, when run, may disable one or more of POS terminals 2001. POS terminals 2001 may be associated with their own card readers (not shown) that receive a chip programmed by card reader 2005 and/or surcharge engine 2007.

Figure 21:
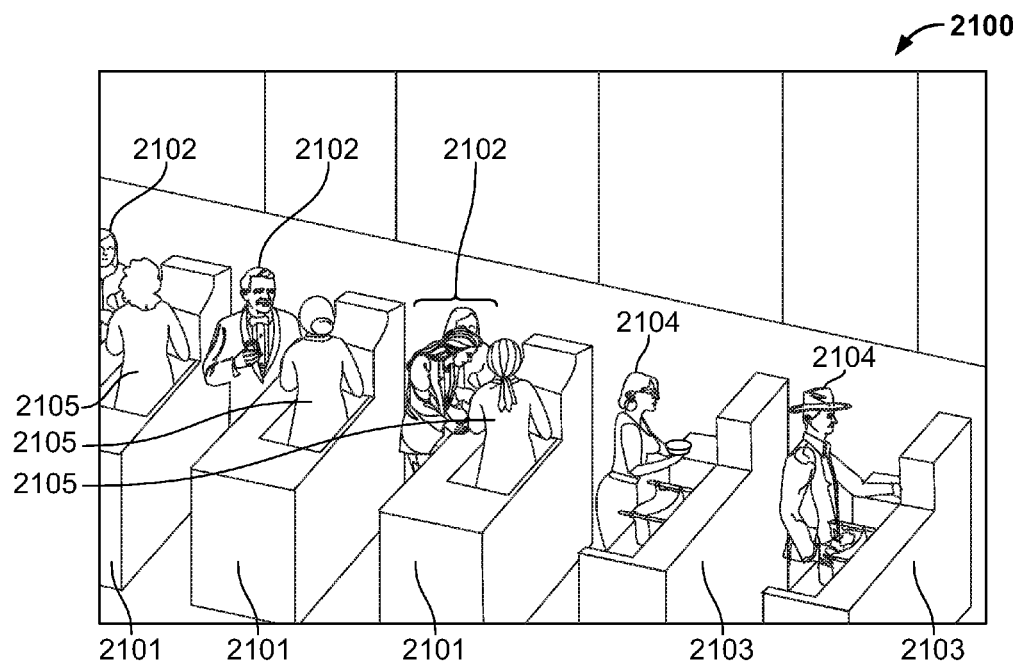
FIG. 21 shows an illustrative scenario and apparatus in accordance with the principles of the disclosure.

FIG. 21 shows illustrative scenario 2100. Scenario 2100 shows customers 2102 being served by clerks 2105 at checkout lanes 2102. Scenario 2100 also shows customers 2104 using self-serve checkout lanes 2103. Customers 2102 and 2104 may present a payment instrument to pay for purchases. Customers 2102 and 2104 may insert a chip on a payment instrument into a card reader and transfer information stored on the chip to a merchant POS system (such as merchant POS system 1905, shown in FIG. 19).

Figure 22:
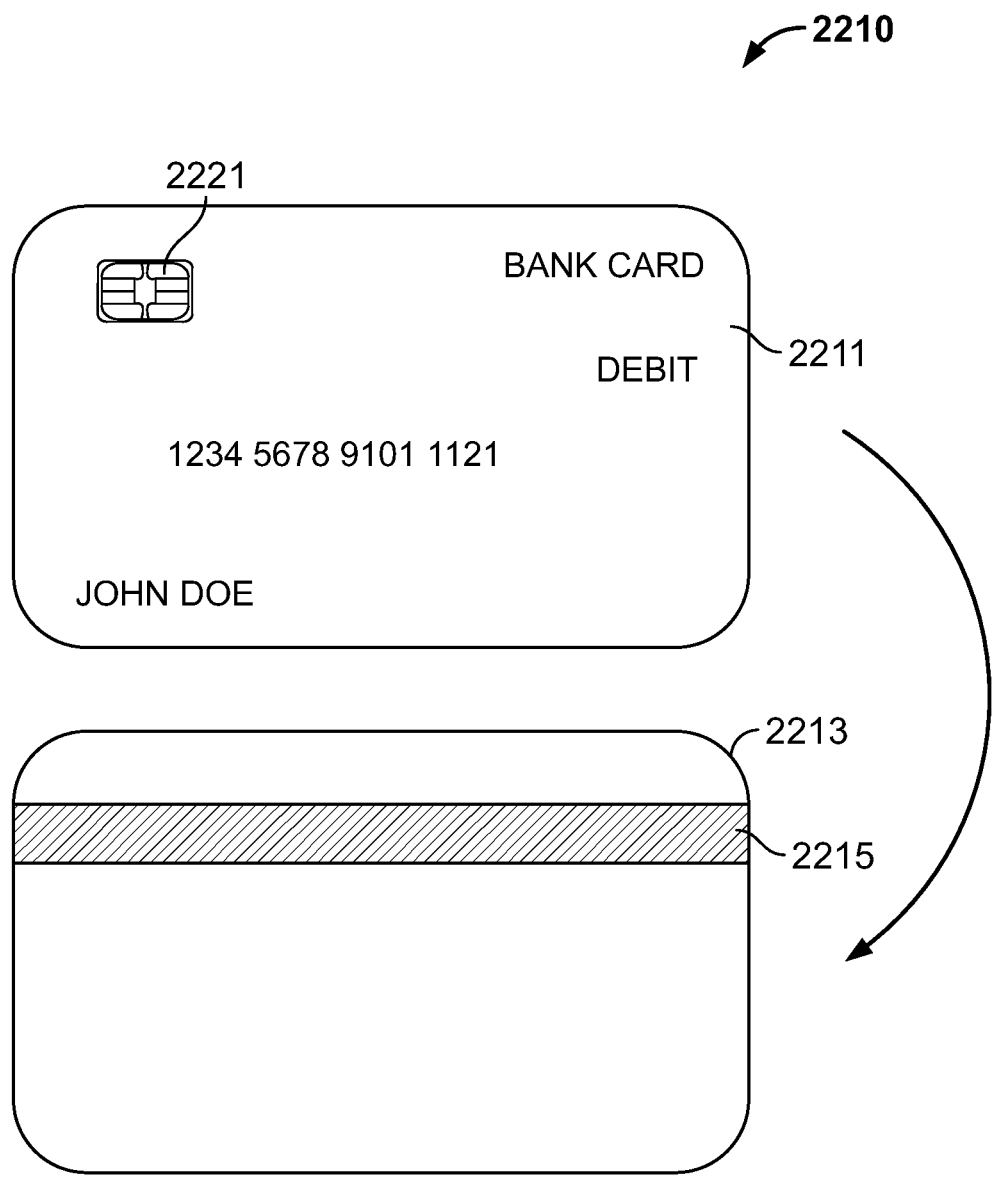
FIG. 22 shows illustrative apparatus in accordance with the principles of the disclosure.

FIG. 22 shows illustrative payment instrument 2210. Payment instrument 2210 may be used by customers 2102 and 2104 (shown in FIG. 21). Payment instrument 2210 includes opposing faces 2211 and 2213.

Payment instrument 2210 may include chip 2221 on face 2211. Chip 2221 may be inserted into a card reader (not shown). The card reader may extract information stored on chip 2221. The information stored on chip 2221 may include copies of information printed or embossed on face 2211.

Chip 2221 may also store executable instructions. Executable instruction may be pushed or loaded onto payment instrument 2210 in response to detecting a surcharge violation. The detected surcharge violation may have been triggered when payment instrument was used to conduct a transaction (for example, as shown in FIG. 21). A detected surcharge violation may have been imposed on another customer (not the user of payment instrument 2210).

In some embodiments, chip 2221 may be positioned underneath a surface of face 2211. In such embodiments, chip 2221 (and information stored thereon) may be accessible via induction or other contactless methods of electronically transferring data and/or power.

Face 2213 may include magnetic stripe 2215. Magnetic stripe 2215 may allow payment instrument 2210 to be used with card readers that read magnetic stripes. For example, inserting payment instrument 2210 into a card reader may include swiping payment instrument 2210 through the card reader.

FIG. 23 shows illustrative apparatus 2300. Apparatus 2300 includes payment instrument 2301. Payment instrument 2301 includes chip 2302. In some embodiments chip 2302 may be an EMV chip.

Payment instrument 2301 may be used to conduct a transaction at a POS terminal that includes or is linked to card reader 2303. When chip 2302 is inserted into card reader 2303, card reader 2303 may provide power to chip 2302. When chip 2303 is inserted into card reader 2303, data stored on chip 2303 may be transferred to card reader 2303.

Data stored on chip 2302 may include executable instructions. The executable instructions may, after being read or extracted by card reader 2303, trigger a disabling of a POS terminal (not shown) linked to card reader 2303. Executable instructions may be loaded onto chip 2302 when chip 2302 is inserted into another card reader (not shown). The other card reader may include one or more features of card reader 2303.

Figure 24:
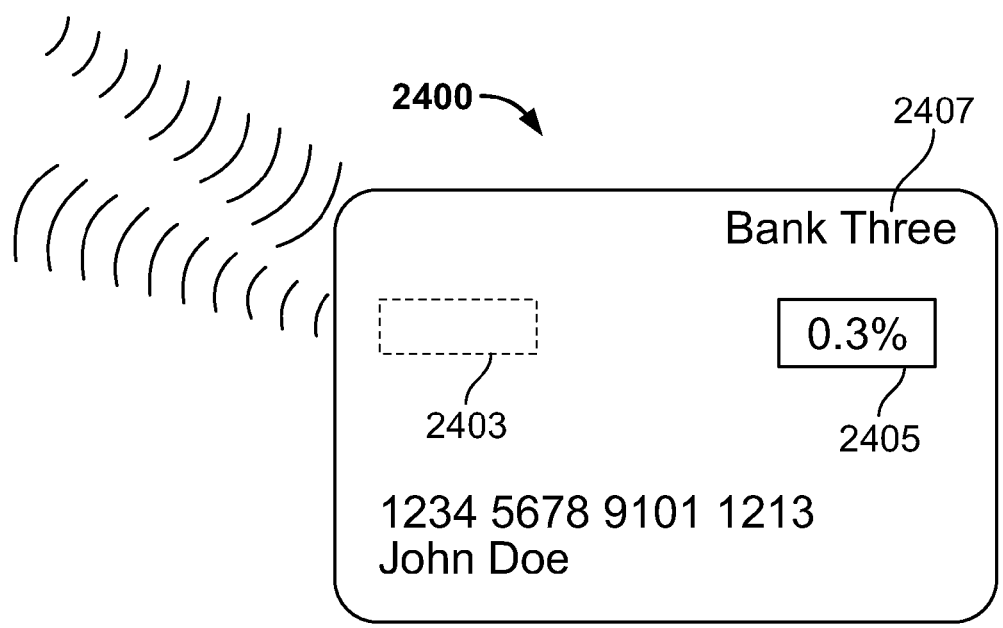
FIG. 24 shows an illustrative apparatus in accordance with the principles of the disclosure

FIG. 24 shows illustrative payment instrument 2400. Payment instrument 2400 includes display 2405. Payment instrument 2400 includes chip 2403. Chip 2403 may include a transceiver that wirelessly receives information. The received information may be stored on payment instrument 2400. Chip 2403 may wirelessly transmit information stored on payment instrument 2400. The information stored and/or transmitted to payment instrument 2400 via chip 2403 may include surcharge attributes (illustrative attributes listed in Table 4), transaction attributes (illustrative attributes listed in Table 5) and/or payment instrument attributes (illustrative attributes listed in Table 6).

For example, chip 2403 may transmit an identity of the payment instrument to a POS terminal (shown in FIG. 19, item 1923). A POS controller (shown in FIG. 19, item 1921) may determine a surcharge amount associated with the identity. The surcharge amount may be received by chip 2403. Display 2405 may present the surcharge amount to the customer in possession of payment instrument 2400.

Payment instrument 2400 may store a "surcharge history." When payment instrument 2400 later communicates with a card reader, executable instructions may be loaded onto payment instrument 2400. For example, when payment instrument 2400 communicates with an ATM of an issuer, the ATM may be configured to extract and/or examine the surcharge history stored on payment instrument 2400. When examining the surcharge history, the ATM may identify one or more surcharge violations associated with payment instrument 2400.

The ATM may then load executable instructions onto payment instrument 2400 that are configured to disable a target POS terminal associated with the identified surcharge violations. When payment instrument 2400 subsequently communicates with the target POS terminal (e.g., via an associated card reader), the instructions may trigger a disabling of the target POS terminal.

Figure 25:
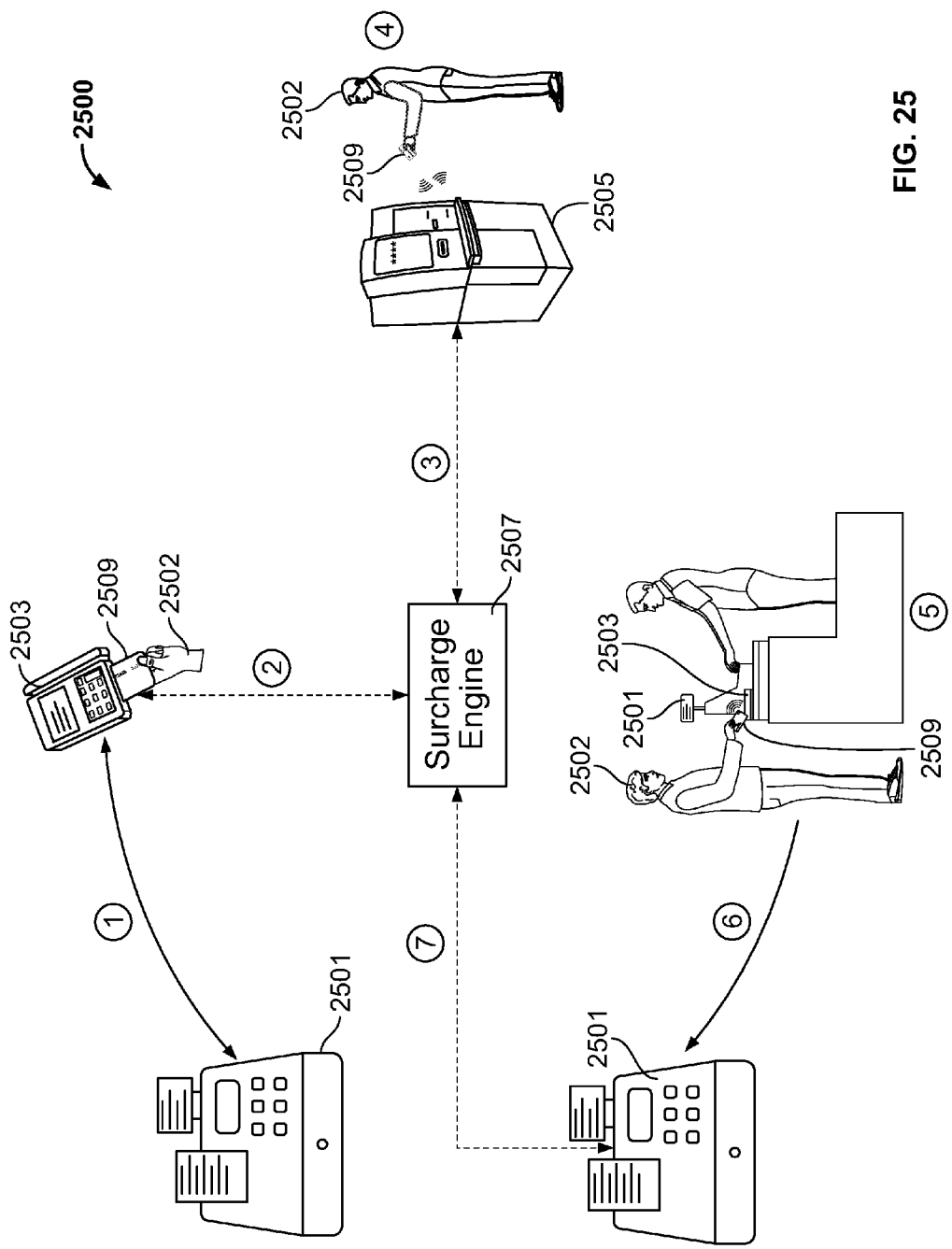
FIG. 25 shows an illustrative scenario and associated apparatus in accordance with the principles of the disclosure.

FIG. 25 shows illustrative process flow 2500. Process flow may begin at step 1. Step 1 shows POS terminal 2501 communicating with associated card reader 2503. Customer 2502 has inserted payment instrument 2509 into card reader 2503. For example, customer 2502 may insert payment instrument 2509 into card reader 2503 to complete a purchase or other transaction at POS terminal 2501.

At step 2, surcharge engine 2507 examines one or more attributes associated the transaction conducted in step 1. Surcharge engine 2507 may include one or more features of surcharge engine 305 (shown in FIG. 3), surcharge engine 1805 (shown in FIG. 19), surcharge engine 1901 (shown in FIG. 19) and surcharge engine 2009 (shown in FIG. 20). In some embodiments, surcharge attributes or other transaction information may be stored on payment instrument 2509. Surcharge engine 2507 may detect a surcharge violation and determine whether remedial action is warranted.

If surcharge engine 2507 determines that remedial action is warranted, at step 3, surcharge engine 2507 may instruct ATM 2505 to load executable instructions onto payment instrument 2509. The executable instructions may be configured to disable POS terminal 2501 when payment instrument 2509 is inserted into card reader 2503. In some embodiments, communication with surcharge engine 2507 may be omitted. Information stored on payment instrument 2509 may be later analyzed when payment instrument 2509 is inserted into ATM 2505.

Step 4 shows customer 2502 using payment instrument 2509 to access ATM 2505. When customer 2502 accesses ATM 2505, executable instructions that disable POS terminal 2501 may be loaded onto payment instrument 2509.

Step 5 shows customer 2502 inserting payment instrument 2509 into card reader 2503 a second time. For example, customer 2502 may return to a merchant location to make another purchase. FIG. 25 shows customer 2502 using POS terminal 2501 and card reader 2503 to conduct another transaction.

At step 6, executable instructions loaded onto payment instrument 2509 by ATM 2505 trigger a disabling of POS terminal 2501.

In some embodiments, when customer 2502 accesses any POS terminal at the merchant location to conduct another transaction, the executable instructions loaded by ATM 2505 onto payment instrument 2509 may trigger a disabling of POS terminal 2501.

Step 7 shows that in some embodiments, surcharge engine 2507 may re-enable POS terminal 2501 after it has been disabled. In some embodiments, the executable instructions may disable POS terminal 2501 for a pre-determined period of time.

Figure 26:
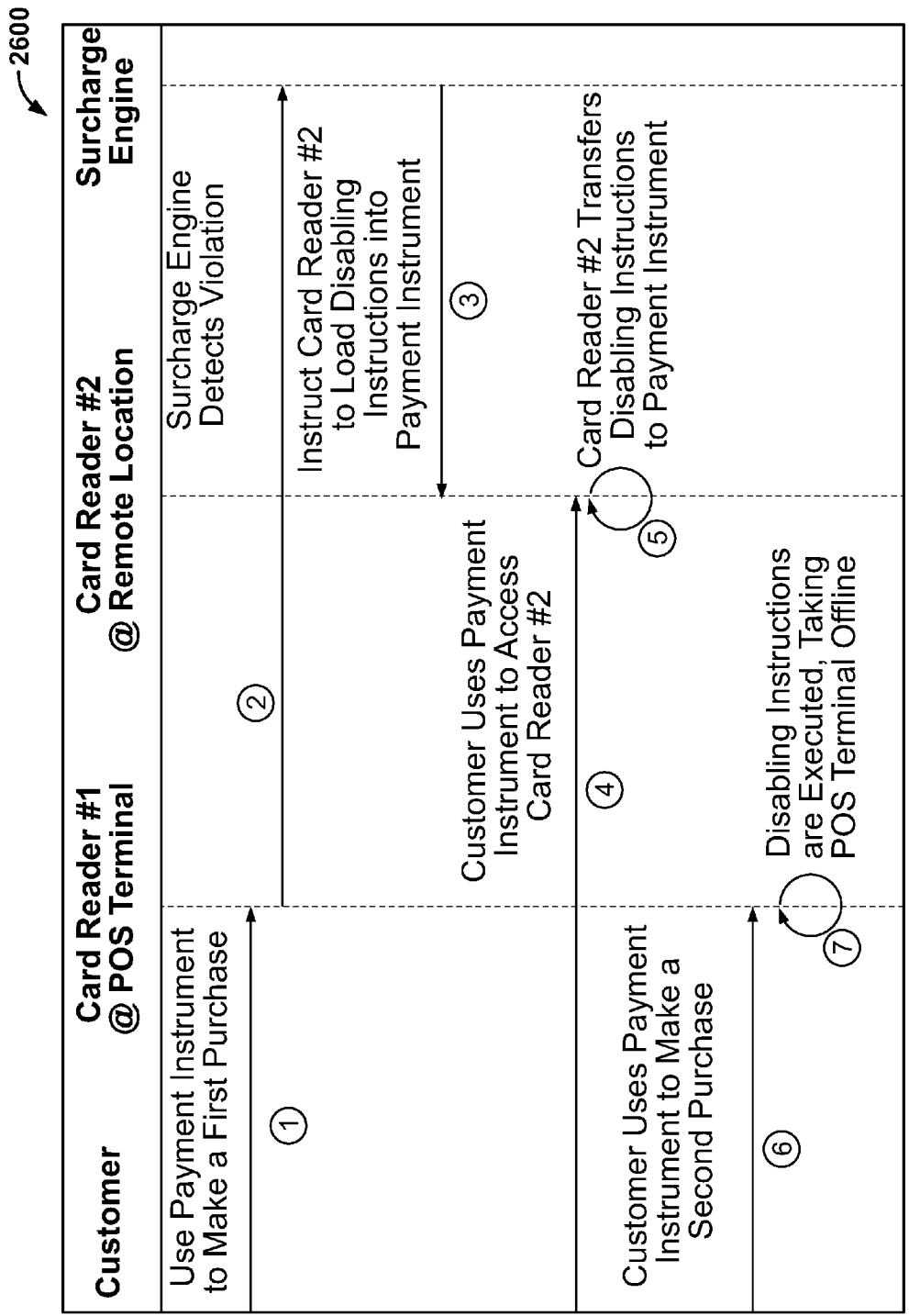
FIG. 26 shows an illustrative process in accordance with the principles of the disclosure.

FIG. 26 shows illustrative transaction flow 2600. At step 1, a customer uses a payment instrument to make a first purchase at a merchant location. The customer may use a first card reader linked to a POS terminal to complete the first purchase. At step 2, a surcharge engine detects that the POS terminal has triggered a surcharge violation when processing the first purchase.

At step 3, the surcharge engine communicates with a second card reader at a second location. In some embodiments, the surcharge engine may communicate with a device (e.g., ATM or teller station) at the second location linked to the second card reader.

The surcharge engine may instruct the device or second card reader to load disabling instructions onto the payment instrument. At step 4, the customer inserts the payment instrument into the second card reader. For example, the customer may insert the payment instrument into the second card reader associated with an ATM to withdrawn cash.

At step 5, the second card reader transfers disabling instructions onto the payment instrument. At step 6, the customer returns to the merchant location and uses the payment instrument to make a second purchase. When the customer makes the second purchase, the disabling instructions stored on the payment instrument are run. At step 7, running the disabling instructions triggers a disabling of one or more POS terminals at the merchant location.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for determining compliance with surcharge rules in connection with a transaction between two or more transaction participants have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. A system for controlling operation of a target point-of-sale ("POS") terminal at a merchant location, the system comprising:
   a payment instrument comprising a reprogrammable chip;
   a first card reader that is configured to:
      provide power to the chip; and
      load, onto the chip, executable instructions that, when run, power-off the target POS terminal; and
   a second card reader linked to the target POS terminal that is configured to provide power to the chip and run the executable instructions loaded on the chip;
   wherein the executable instructions, when run, power-off the target POS terminal within a pre-determined period of time after the chip is inserted into the second card reader.

2. The system of claim 1, wherein the executable instructions, when run, power-off a plurality of POS terminals at the merchant location.

3. The system of claim 1 wherein the first card reader is positioned within an automated teller machine ("ATM").

4. The system of claim 1 wherein the second card reader is at the merchant location.

5. The system of claim 1 wherein, the executable instructions for powering-off the target POS terminal are further configured to power-on the target POS terminal after expiration of a pre-determined period of time.

6. A system for disabling a target point-of-sale ("POS") terminal at a merchant location, the system comprising:
   a payment instrument comprising a chip;
   a first card reader linked to the target POS terminal that is configured to receive the chip; and
   a second card reader that is configured to:
      receive the chip;
      associate the payment instrument with at least one surcharge violation imposed by the target POS terminal;
      set a flag on the chip that identifies the target POS terminal; and
      load, onto the chip, executable instructions that disable the target POS terminal after the chip is received by the first card reader;
   wherein the first card reader, in response to receiving the chip after the executable instructions have been loaded onto the chip by the second card reader, is configured to:
      detect that the flag has been set on the chip; and
      trigger execution of the executable instructions on the chip and thereby disable the target POS terminal.

7. The system of claim 6 wherein the chip is an EMV chip.

8. The system of claim 6 wherein the second card reader is embedded in an automated teller machine ("ATM").

9. The system of claim 6 wherein the executable instructions are configured to disable two or more target POS terminals at the merchant location.

10. The system of claim 6 wherein the second card reader is configured to program a plurality of chips with executable instructions that disable the target POS terminal.

11. The system of claim 6 wherein, before programming the chip, the second card reader is configured to:
   estimate a time when the chip is expected to be inserted into the second card reader; and
   program the chip when the estimate is less than a threshold period of time.

12. The system of claim 11 wherein, the estimate is determined based on a transaction history associated with the payment instrument.

\* \* \* \* \*